(12) United States Patent
Grace

(10) Patent No.: US 6,694,264 B2
(45) Date of Patent: Feb. 17, 2004

(54) METHOD AND SYSTEM FOR CREATING IRREGULAR THREE-DIMENSIONAL POLYGONAL VOLUME MODELS IN A THREE-DIMENSIONAL GEOGRAPHIC INFORMATION SYSTEM

(75) Inventor: John D. Grace, Long Beach, CA (US)

(73) Assignee: Earth Science Associates, Inc., Long Beach, CA (US)

( * ) Notice: Subject to any disclaimer, the term of this patent is extended or adjusted under 35 U.S.C. 154(b) by 0 days.

(21) Appl. No.: 10/323,159

(22) Filed: Dec. 18, 2002

(65) Prior Publication Data

US 2003/0112235 A1 Jun. 19, 2003

Related U.S. Application Data

(60) Provisional application No. 60/342,018, filed on Dec. 19, 2001.

(51) Int. Cl.$^7$ .............................................. G06F 19/00
(52) U.S. Cl. ........................................ 702/16; 345/419
(58) Field of Search ............................ 702/16, 14, 12; 345/418, 419; 367/135

(56) References Cited

U.S. PATENT DOCUMENTS

| | | | |
|---|---|---|---|
| 4,991,095 A | 2/1991 | Swanson | 702/16 |
| 5,126,978 A | 6/1992 | Chaum | 367/135 |
| 5,790,123 A | 8/1998 | Wald et al. | 345/419 |
| 5,953,680 A | * 9/1999 | Divies et al. | 702/5 |
| 6,012,016 A | 1/2000 | Bilden et al. | 702/12 |
| 6,012,018 A | * 1/2000 | Hornbuckle | 702/16 |
| 6,191,787 B1 | 2/2001 | Lu et al. | 345/418 |
| 6,229,546 B1 | 5/2001 | Lancaster et al. | 345/419 |
| 6,307,555 B1 | * 10/2001 | Lee | 345/423 |

OTHER PUBLICATIONS

ESRI Shapefile Technical Description, An ESRI White Papter, Jul. 1998.
Printout of online-help from ESRI's ArcGIS, "PolyLineZ", "Make".
Printout of online-help from ESRI's ArcGIS, "MultiPatch".
Printout of ESRI's Online Support Center documents on Sphere Multipatch.
Printout of ESRI's Online Support Center documents on Cylinder Multipatch.
Printout of ESRI's Online Support Center documents on Cube Multipatch.
Printout of ESRI's Online Support Center documents on Pyramid Multipatch.
Printout of online-help from ESRI's ArcGIS, "To Create Surfaces From Point Samples".
Excerpts from Johnston, Kevin, et al., "Using ArcGIS Geostatistical Analyst", ESRI ArcGIS.
Excerpts from Davis John C., "Statistics and Data Analysis on Geology", Second Edition, John Wiley & Sons.
Printout of online-help from ESRI's ArcGIS, "PointZ", "AsMultiPointZ".

(List continued on next page.)

Primary Examiner—John Barlow
Assistant Examiner—Victor J. Taylor
(74) Attorney, Agent, or Firm—Dobrusin & Thennisch PC; Jenny Lee

(57) ABSTRACT

Methods, and models therefrom, to construct a 3-D polygonal model of a 3-D irregular volume within a GIS platform that include introducing data relating to the volume; estimating at least one 2-D polygon representing the volume's lateral boundary, estimating irregular surfaces representing the volume's top and bottom; clipping the estimated surfaces with the estimated 2-D polygon; constructing multipatches of a network of triangular panels or a grid of regularly spaced polylineZs; and joining the attributes to the model.

25 Claims, 20 Drawing Sheets

OTHER PUBLICATIONS

Printout of online–help from ESRI's ArcGIS, "Unioning Features".

Excerpts from Minami, Michael, "Using ArcMap", ESRI ArcGIS, p. 385.

Printout of online–help from ESRI's ArcGIS, "Extractby-Polygon".

Excertps from Minami, Michael, "Using ArcMap", ESRI ArcGIS, p. 315.

Printout of online–help from ESRI's ArcGIS, "Join", "FTab".

Excerpt from Minami, Michael, "Using ArcMap", ESRI ArcGIS, p. 383.

Printout of online–help from ESRI's ArcGIS, "Buffering Graphics and Features", "Create Buffers".

Excerpt from Minami, Michael, "Using ArcMap", p. 472.

Printout of online–help from GOM3, "View Tool Bars".

Printout of online–help from GOM3 Documentation and Help for ArcView 3.x., "Hotlink Tool".

Printout of online–help from ESRI's ArcGIS, "Explode".

Printout of GOM3 System Documentation and Help, "How to Link to Excel".

Documentation from Booth, Bob, "Using ArcGIS 3D Analyst", ESRI ArcGIS, p. 81.

Using ArcGIS Spatial Analyst, Environmental Systems Research Institute (Copyright 2001).

Using ArcGIS Geostatistical Analyst, Environmental Systems Reseach Institute (Copyright 2001).

Using ArcGIS 3D Analyst, Environmental Systems Research Institute (Copyright 2000).

Using Avenue, Environmental Systems Research Institute (Copyright 1996).

ArcView GIS, Environmental Systems Research Institute (Copyright 1996).

GOM3 Documentation and Help, Earth Science Associates (Copyright May 2003).

* cited by examiner

METHOD AND SYSTEM FOR CREATING IRREGULAR THREE-DIMENSIONAL POLYGONAL VOLUME MODELS IN A THREE-DIMENSIONAL GEOGRAPHIC INFORMATION SYSTEM

CLAIM OF BENEFIT OF FILING DATE

The present application claims the benefit of the filing date of U.S. Provisional Application Serial No. 60/342,018 entitled "A Process and Apparatus for Creating Irregular Three-Dimensional Polygonal Models of Oil and Gas Reservoirs in a Three-Dimensional Geographic Information System", filed on Dec. 19, 2001 and hereby incorporated by reference in its entirety.

FIELD OF INVENTION

This invention relates generally to the representation of irregular three-dimensional bodies and fields in a three-dimensional geographic information system. More specifically, this invention provides a method and a system for creating irregular three-dimensional polygonal models of oil and gas reservoir bodies or other three-dimensional volumes within a three-dimensional geographic information system.

BACKGROUND OF INVENTION

Geographic information systems (GIS) are used in a very wide variety of applications in industries such as urban planning, agriculture, defense, utilities, oil and gas and the like. In virtually all GIS applications, the data and analysis performed on it are in two dimensions that typically represent coordinates on the surface of the earth. GIS technology is different from other computer-generated maps in that it allows for the existence and the access to the underlying informational database. For example, a GIS-generated map of the United States showing counties could be queried interactively to provide data on populations in counties, or income or any other variable tied to the underlying database that contained county-level information. In oil and gas applications, a two-dimensional GIS-generated map of oil fields would typically contain data on the reserves of the fields, number of wells, production levels, etc., all of which could be interactively queried by the user. GIS technology is also different from other computer-generated maps in that it has the ability to perform spatial analysis, the results of which are related to the location of mapped features and their attributes. For example, in a GIS-based "911" system, an operator receiving an emergency call enters the caller's address and the GIS computes the closest fire station to the caller and the shortest-time route from that station to the caller. In oil and gas applications, an analysis could be performed that mapped all oil wells that produce over a certain volume of oil per day and are located within a specific distance of an identified oil pipeline. This type of application would help determine the long-run supply of oil from that pipeline.

In the oil and gas industry, the application of GIS technology to specific problems is typically accomplished by utilizing a generic GIS software platform, adding data to it and, in some instances, customizing the GIS software for the specific application. The GIS software platforms are purchased typically from one of the major developers such as Environmental Systems Research Institute, Inc. (ESRI) located in Redlands, Calif. that sells several types of GIS systems under the general names ArcInfo, ArcView and ArcGIS; MapInfo Corporation located in Troy, N.Y. that sells GIS systems under the general name of MapInfo; Intergraph Corporation located in Huntsville, Ala. that sells a family of GIS platforms under the general name GeoMedia; and the like. Data used in the system is typically either provided by the user or purchased from a geospatial data vendor or governmental agencies such as IHS Energy (Englewood, Colo.), PennWell Corporation (Tulsa, Okla.), A2D Technologies (Humble, Tex.), the US Geological Survey, the US Minerals Management Service, state geological surveys, and the like. Customization of the GIS platform to specific purposes can also be done by the users, contract GIS programmers, firms specializing in this work such as Earth Science Associates (Long Beach, Calif.) and the like. U.S. Pat. No. 6,012,016 (hereby expressly incorporated by reference in its entirety) typifies the process above in which a user has developed customized programming for a generic GIS platform (in their preferred embodiment, one of the products of ESRI) to manage and analyze oil well data obtained from a geospatial data vendor (in their preferred embodiment, Petroleum Information Corporation, now part of IHS Energy).

Most applications of GIS technology to date concern only features on the surface of the earth and provide two dimensions (identified by the latitude and longitude coordinates of location) to represent feature locations and to perform spatial operations on them. For example, in the oil and gas industry, features in two-dimensional GIS are represented by points (e.g., oil wells) and lines (e.g., oil pipelines) or polygons (e.g., the area of an oil field). While two-dimensional analysis is sufficient for some applications, three-dimensional analysis is preferred for various applications including, without limitations, oil and gas GIS applications because oil and gas fields are by their nature three-dimensional. Fields are not located on the surface of the earth, but thousands of feet below the surface. The accumulations of oil and gas at these depths occupy rock strata of a certain thickness, which may vary over the lateral (i.e., two-dimensional) extent of the field. Oil and gas wells are also three-dimensional, having trajectories that are only fully described by a series of triplets of observations that list the path of the well in latitude, longitude and depth below a datum (usually mean sea level). Accordingly, there is a need for three-dimensional GIS technology.

Existing three-dimensional GIS technology is limited and generally falls into two categories. The first category is representation of the three-dimensional topography of the earth's surface in a GIS system, most commonly known as a digital terrain model. For example, both ESRI's ArcView and ArcInfo GIS products have the capability of estimating an irregular surface from data sets of observations on the elevation of the earth's surface at control points located by their latitude and longitude. That surface may then be introduced and manipulated within their generic GIS platforms. MapInfo's MapInfo Professional GIS product allows viewing and manipulation of a digital terrain model within its system. U.S. Pat. No. 5,790,123 (hereby expressly incorporated by reference in its entirety) describes a method for generating terrain surfaces and lists its use within a GIS as an application. U.S. Pat. No. 6,229,546 (hereby expressly incorporated by reference in its entirety) describes a method and system for generation of terrain models, which may be assisted by the use of a GIS in the data management phase of the process. However, the output surface from the method, in a file format called VRML, would require modification for use within at least some commercial GIS platforms (e.g., ArcView), as VRML is not a valid input data format. Moreover, while generation of a three-dimensional surface and introduction of it into a three-dimensional GIS is an important innovation, such a surface is an irregular plane, not a three-dimensional volume. Such a surface, therefore, is geometrically insufficient to describe a three-dimensional volume such as an oil and gas reservoir, an aquifer, a defined volume of water within an ocean, sea or lake, a defined air mass within the atmosphere, and the like. Accordingly, there is a need to provide a three-dimensional GIS system that can create and manipulate a three-dimensional volume.

The second category of existing three-dimensional GIS technology is representation of man-made structures located on the earth's surface, such as buildings. These applications typically take files generated by computer-aided design (CAD) software systems that provide the latitude, longitude and elevation of points sufficient to describe a structure (e.g., the locations of the corners of a base of the building and the top of a building). For example, in ESRI's 3-D Analyst extension to ArcView, the GIS reads those coordinates and connects the control points to create virtual walls, floors and roofs to a building and correctly locates the building on the representation of the earth's surface within a three-dimensional GIS scene. It is then possible to assign attributes to the three-dimensional model of the building so that it can be queried within the GIS and allows users to perform spatial operations on those three-dimensional features. In such an application, the model of the building built by the three-dimensional GIS system is an exact (if often simplified) representation of the geometry, as the dimensions and coordinates of buildings are exactly known from blueprint-type information typically produced by CAD software. For very simple geometric shapes (e.g., a building that is geometrically a simple box), the three-dimensional representation can be constructed by "extruding" a rectangle representing the lateral extent of the building to an elevation representing the height of the building top above the surface of the ground (both ESRI and MapInfo systems do this). The ability to create three-dimensional features, such as buildings, constructed on exact boundary coordinates, and use them within a three-dimensional GIS is an important innovation. However, this method is not responsive to construction of three-dimensional features within a three-dimensional GIS where the boundaries are not exactly specified and/or are irregular.

Outside of GIS technology, there are computer methods for visualization of irregular three-dimensional features below the surface of the earth. For example, Schlumberger Information Services (Houston, Tex.) produces a suite of software products under the general name GeoFrame which includes a module called GeoVis that attempts to provide three-dimensional visualization of oil and gas reservoirs and other bodies of rock with specific properties. GeoVis relies on volume-cell (voxel) technology in which the volume of earth being modeled is divided into a very large number of three-dimensional cells. Each individual cell is assigned characteristic properties, based on the collection, processing and interpretation of seismic data over that volume of the earth's crust. Cells can be classified based on characteristics of interest (e.g., specific seismic impedance, interpreted values of porosity, interpreted composition of interstitial fluid). Cells belonging to a class can then be "turned-on" or assigned a color so that they can be seen on the computer screen within a three-dimensional volume representing that portion of the earth's crust. By assigning different colors to cells that possess common attributes (or the same range of attribute values), it is possible to see the geometric relationships between natural, irregular three-dimensional bodies within the volume of the earth's crust under examination. Another example, is Landmark Graphics' (Houston, Tex.) "volume interpretation system" called Earth Cube, which is very similar to GeoVis. Earth Cube input data comes principally from seismic data acquired throughout a volume of the earth's crust and it represents sub-volumes of interest by attributes assigned to a very large number of cells into which the total volume is divided. U.S. Pat. No. 4,991,095 (hereby expressly incorporated by reference in its entirety) also describes a method for generation of three-dimensional computer models of irregular geologic features using the volume-cell approach. While the volume-cell approach to visualization of irregular three-dimensional features in the subsurface is an important method for visualization, these techniques are not part of GIS technology. Thus, they do not support GIS functionalities of relating unified features (as opposed to a collection of discrete cells with the same attribute values) to underlying databases. They also do not have the ability to perform the spatial analytic functions (e.g., query, legending, measurement, proximity, intersection, and the like) associated with GIS technology.

Accordingly, there is a need to provide a three-dimensional GIS system that can create and manipulate a three-dimensional irregular volume even if the boundaries of such volume are not specified.

SUMMARY OF THE INVENTION

The present invention fulfills these needs by providing a method and a system for constructing three-dimensional polygonal models of the three-dimensional irregular volumes (e.g., natural fields, natural bodies, and the like) for use in a GIS system. The present invention can create and manipulate models of these irregular three-dimensional volumes within the GIS platform even if the boundaries of such volumes are not completely specified in the input data. The irregular three-dimensional volume models constructed by the present invention can be associated with databases containing attribute data on the three-dimensional irregular volume being modeled and are also susceptible to spatial analytic techniques of GIS technology.

The present invention is particularly suitable for oil and gas reservoirs but can be used in various other applications such as concentrations of specific elements or compounds (e.g., metals, diamonds, and the like) in a specific three-dimensional irregular volume of the earth's crust, aquifers (e.g., to represent volumes of rock occupied by water), quality of a specific volume of air or water over a geographical area, and the like. In contrast to the methods applied to construct representation of man-made objects, such as buildings, certain embodiments of the present invention do not require complete specification of the geometry of the feature being modeled, and the method is performed absent such information. In contrast to the visualization methods based on the voxel approach, the invention constructs unitary three-dimensional irregular volume models that can be associated with databases containing attributes on the modeled volumes and are susceptible to spatial analytic techniques of GIS technology.

The present invention produces a realistic depiction of natural fields or bodies such as the subsurface aspects of oil and gas field within a GIS platform. More preferably, the depiction's employs a generic GIS platform. The present invention allows the user to visualize the geometric and attribute relationships between irregular three-dimensional bodies, such as oil and gas reservoirs, the wells and production equipment within them and rock sample observation points and surfaces constructed from them. Since the invention operates within a GIS platform, the present invention further contemplates performing one or more of a query, legending, measurement, proximity, intersection and other spatial analytic GIS operations.

In one aspect, the invention provides a method comprising: (1) introducing desired data including control points [e.g., geographic points of observations] and attributes relating to a three-dimensional irregular volume into a GIS platform; (2) estimating at least one two-dimensional polygon representing a lateral boundary of the three-dimensional irregular volume based upon values of a variable of interest at the control points; (3) estimating irregular surfaces representing top and bottom of the three-dimensional irregular volume by interpolating grids of depth values from the control points for the top and bottom surfaces of the three-dimensional irregular volume; (4) clipping the estimated irregular surfaces with the estimated at least one two-dimensional boundary polygon; (5) constructing multipatches of a network of triangular panels representing top surface, bottom surface, and sides of the three-dimensional irregular volume to produce a solid three-dimensional irregular volume model within the GIS platform; and (6) joining the attributes to the solid three-dimensional irregular volume model within the GIS platform.

In another aspect, the invention provides a method comprising: (1) introducing desired data including control points and attributes relating to a three-dimensional irregular volume into a GIS platform; (2) estimating at least one two-dimensional polygon representing a lateral boundary of the three-dimensional irregular volume based upon values of a variable of interest at the control points; (3) estimating irregular surfaces representing top and bottom of the three-dimensional irregular volume by interpolating grids of depth values from the control points for the top and bottom surfaces of the three-dimensional irregular volume; (4) clipping the estimated irregular surfaces with the estimated at least one two-dimensional boundary polygon; (5) constructing a grid of regularly spaced polylineZs representing top surface, bottom surface, and sides of the three-dimensional irregular volume to produce a wire frame three-dimensional irregular volume model within the GIS platform; and (6) joining the attributes to the wire frame three-dimensional irregular volume model within the GIS platform.

In another aspect, the invention provides a method that includes repeating the above-mentioned steps (for either solid or wire frame models) to create additional three-dimensional irregular volume models within the GIS platform. Finally, the method may optionally include adding features that are not created by the above-mentioned steps including, without limitations, two-dimensional structures, polylines, multipoints, grids, raster images, vector data such as that derived from well logs, potential field and seismic techniques, and the like.

In another aspect, the invention provides a method to create three-dimensional irregular volume model of an oil and gas reservoir within a GIS platform comprising: (1) collecting data on wells, reservoirs, fields and other features that will be included in the three-dimensional irregular volume model of the reservoir within the GIS platform; (2) loading desired software on to a computer system; (3) organizing the data on wells, reservoirs, fields and other features of interest into a database and the GIS platform; (4) estimating at least one two-dimensional polygon representing the lateral boundary of the reservoir; (5) identifying the reservoir that is desired for creating the three-dimensional irregular volume model within the GIS platform; (6) estimating irregular surfaces representing the top and bottom of the reservoir based on the control points provided by wells that intersect the reservoir; (7) clipping the estimated irregular surfaces with the estimated at least one two-dimensional polygon representing the lateral boundary of the reservoir; (8) constructing multipatches to represent the top surface, bottom surface and sides of the reservoir to produce the solid volume three-dimensional irregular polygonal model of the reservoir within the GIS platform; (9) joining the attributes on the reservoir to the multipatch model of the reservoir within the GIS platform. This preferred embodiment may optionally include creating a wire frame model of reservoir by constructing a grid of regularly spaced polylineZs and/or its functional equivalent representing top surface, bottom surface, and sides of the reservoir to produce a wire frame three-dimensional irregular volume model of the reservoir within the GIS platform and joining the attribute data to the wire frame three-dimensional irregular volume model of the reservoir within the GIS platform. If the oil and gas field contains more than one reservoir, this preferred embodiment may also optionally include repeating the above-described steps to create either a solid and/or wire frame three-dimensional irregular volume model for each additional reservoir. Finally, this preferred embodiment may optionally include adding features that are not created by the above-mentioned steps for the creation of three-dimensional irregular volume model including, without limitations, two-dimensional structures, polylines, multipoints, grids, raster images, vector data such as that derived from well logs, potential field and seismic techniques, and the like.

In another aspect, the present invention provides a system comprising: (1) a computer system comprising of digital processor, working memory, data storage device, input means (e.g., mouse, keyboard, and the like), display monitor, and optionally, output means (e.g., printer and the like); (2) software that can be used to create a three-dimensional irregular volume model within a GIS platform using the above-described methods of the present invention, wherein data including control points and attributes relating to the three-dimensional irregular volume is stored in the data storage device and can be accessed by the computer system to create the three-dimensional irregular volume model with the GIS platform using the above-described methods of the present invention.

A further understanding of the nature and advantages of the present invention may be realized by reference to the remaining portion of the specifications and the drawings.

DESCRIPTION OF THE PREFERRED EMBODIMENTS

Figure 1:
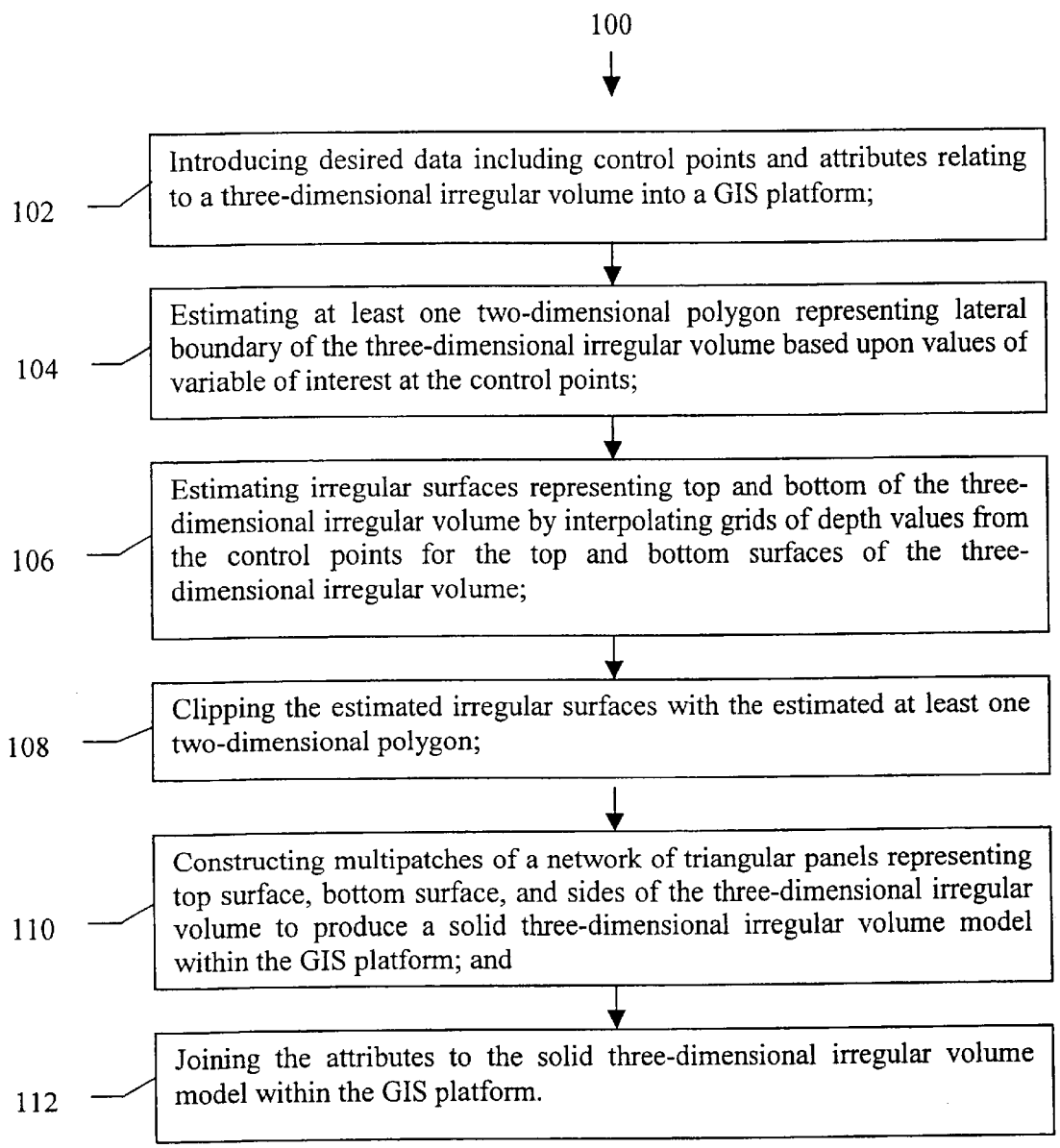
FIG. 1 provides a workflow diagram of a method of the present invention to create a solid three-dimensional irregular volume model within a GIS platform.

The present invention provides a method and a system for constructing three-dimensional polygonal models of three-dimensional irregular volumes for use in a GIS system (even if the boundaries of such volumes are not completely specified in the input data). For the purpose of this specification, the term "polygon" and "polygonal" used herein are intended to include any and all shapes. Furthermore, the models constructed by the present invention can be manipulate within the GIS platform and are susceptible to spatial analytic techniques of GIS technology.
Method to Create a Solid Volume Model
  1. Introducing Data
  Referring to FIG. 1, the method 100 of the present invention is comprised of introducing desired data including control points and attributes relating to a three-dimensional irregular volume into a GIS platform (102). The control points are points of observation on a variable of interest located in one or more dimensions (e.g., a lateral geographic location, depth or elevation range with respect to a vertical datum). The observation data at the control points may be taken by instruments, human inspection, or both. Values of the variable of interest at points away from the control points may be estimated on the basis of values at the control points using art-disclosed methods including, without limitations, inverse distance weighting, kriging, global and local polynomial interpolation, and a combination thereof or the like. Preferably, the attributes are the various properties of interest of the three-dimensional irregular volume. Thus, such properties may include, without limitations, average concentration of a chemical element or compound within the bounds of the volume (e.g., a pollutant or ore); average physical properties (e.g., temperature, pressure, density, viscosity, acoustic properties, etc) or engineering characteristics (e.g., flow rate of wells, recoverable ore, average rate of recharge).

In one embodiment, this introduction step 102 includes initial collection of desired data (including the location of control points and the values of the variables of interest at them) and attributes that will be used in construction of the three-dimensional irregular volume model within the GIS platform. This includes obtaining input data about a desired location, such as by measurement or other observation technique. In another embodiment, the introduction step 102 of the method 100 includes loading suitable software 804 that can be used to create the three-dimensional irregular volume model within the GIS platform onto a suitable computer system 802 comprising of digital processor, working memory, data storage device, input means (e.g., mouse, keyboard, and the like), display monitor, and optionally, an output means (e.g., printer and the like). Details of the suitable software 804 and the computer system 802, which together form the three-dimensional GIS system of the present invention 800 are discussed below. With the suitable software 804 loaded into the computer system 802, the introduction step 102 includes organizing the desired data into a database that can be accessed within the GIS platform.
  2. Estimating Two-Dimensional Polygon
  Referring to FIG. 1, in one preferred embodiment, the method 100 further comprises a step of estimating at least one two-dimensional shape (e.g., a polygon and the like) representing a lateral boundary of the three-dimensional irregular volume based upon the values of the variable of interest at the control points (104). The estimation of the at least one two-dimensional polygon step 104 can be accomplished using art-disclosed methods such as buffers or application of exact or average gridding/contouring techniques (e.g., inverse distance weighting, splines, kriging) and the like based upon the values of the variable of interest at the control points to estimate a boundary representing the lateral boundary of the three-dimensional irregular volume. See, e.g., *ArcView Spatial Analyst*, Environmental Systems Research Institute and in *Using ArcGIS Geostatistical Analyst*, Environmental Systems Research Institute, both of which are hereby incorporated by reference in their entirety.

As indicated in one embodiment, the lateral boundary of the three-dimensional irregular volume can be represented by a single two-dimensional polygon. This implies that the lateral boundary of the top and bottom surfaces is substantially the same. Alternatively, it can be represented by multiple two-dimensional polygons (e.g., two two-dimensional polygons representing the irregular top and bottom surfaces of the three-dimensional irregular volume, implying that the top and bottom surface lateral boundaries are not the same).

After estimation of the at least one two-dimensional polygon representing the lateral boundary of the body or field, the estimation step 104 includes converting the at least one two-dimensional polygon into another suitable format such as a polylineZ format (e.g., a polylineZ) and any functionally equivalent format that may be used in a GIS platform (which may be called a name other than polylineZ). For example, MapInfo Corporation uses a different name for its functionally equivalent format to polylineZ in its MapInfo GIS platforms and systems. PolylineZ format is an art-disclosed format that is used in the GIS platform provided by Environmental Systems Research Institute and the format conversion described above can be achieved via art-disclosed methods. See, e.g., *ArcView Spatial Analyst*, Environmental Systems Research Institute. After the conversion is complete, the polylineZ of the at least one two-dimensional polygon is preferably stored in computer memory for later use in the process.

3. Estimating Irregular Surfaces

Referring to FIG. 1, another aspect of the method 100 comprises a step of estimating irregular surfaces representing top and bottom of the three-dimensional irregular volume by interpolating grids of depth values from the control points for the top and bottom surfaces of the three-dimensional irregular volume (106). The term "depth values" is defined as vertical distance above or below a datum. This estimating irregular surfaces step 106 may include converting the three-dimensional locations of all control points for the top and bottom surfaces (which may be retrieved from the computer memory) into a suitable format such as a multipointZ format (e.g., multipointZs) and any functionally equivalent format that may be used in a GIS platform (which may be called a name other than multipointZ). For example, MapInfo Corporation uses a different name for its functionally equivalent format to multipointZ in its MapInfo GIS platforms and systems. MultipointZ format is an art-disclosed format that is used in the GIS platform provided by Environmental Systems Research Institute and the format conversion described above can be achieved via art-disclosed methods. See, e.g., *ArcView Spatial Analyst*, Environmental Systems Research Institute.

Figure 2:
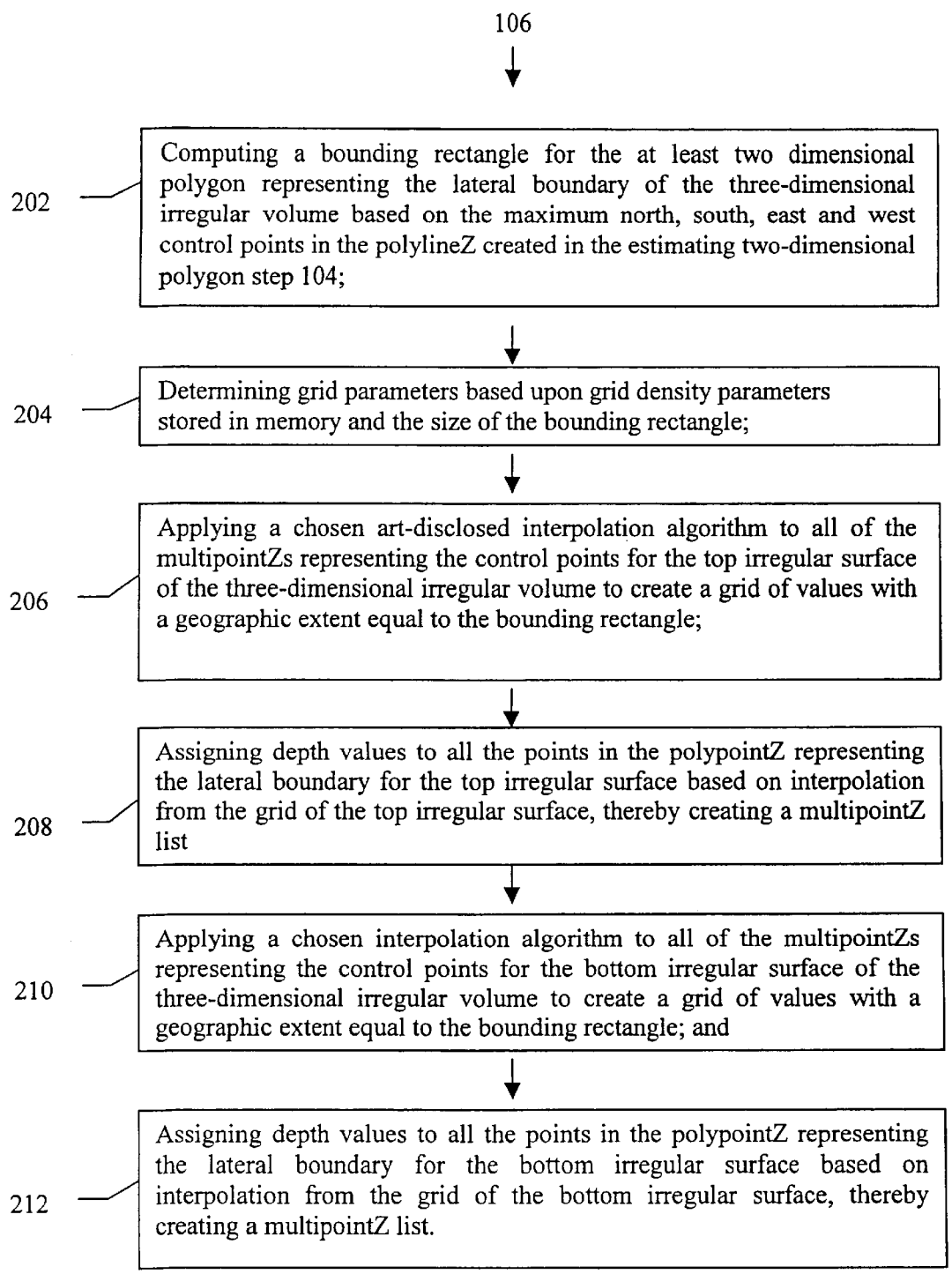
FIG. 2 provides a more detailed diagrammatic view of the estimating irregular surfaces step (106) shown in FIG. 1.

Referring now to FIG. 2, wherein the estimating irregular surface step 106 is shown in greater diagrammatic detail, one preferred approach is to compute a bounding shape (e.g., a rectangle) for the at least one two dimensional polygon representing the lateral boundary of the three-dimensional irregular volume based on the maximum north, south, east and west control points in the polylineZ created in the estimating two-dimensional polygon step 104 (202). The step 106 further includes determining grid parameters based upon grid density parameters stored in memory and the size of the bounding rectangle (204). The numbers of cells on each side of the grid are determined by division of these two types of data (where a cell side length is equal to the length of the parallel side of the bounding rectangle divided by the number of cells to a side). The step 106 also may include applying a chosen art-disclosed interpolation algorithm such as inverse distance weighting, spline-tension, spline-regularized, and the like to all of the multipointZs representing the control points for the top irregular surface of the three-dimensional irregular volume (which may be retrieved from computer memory) to create a grid of values (also in multipointZ format) with a geographic extent equal to the bounding rectangle (206). Each point in the grid is located by latitude, longitude and vertical distance from the chosen datum at that grid point. Thereafter, the step 106 includes assigning depth values to all the points in the polypointZ representing the lateral boundary for the top irregular surface (which may be retrieved from computer memory) based on interpolation from the grid of the top irregular surface, thereby creating a multipointZ list (208). Finally, the step 106 includes repeating sub-step 206 and 208 for the bottom irregular surface of the three-dimensional irregular volume: applying a chosen interpolation algorithm such as, without limitations, inverse distance weighting, spline-tension, spline-regularized, and the like to all of the multipointZs representing the control points for the bottom irregular surface of the three-dimensional irregular volume (which may be retrieved from computer memory) to create a grid of values (preferably also in multipointZ format) with a geographic extent equal to the bounding rectangle (210); and assigning depth values to all the points in the polypointZ representing the lateral boundary for the bottom irregular surface (which may be retrieved from computer memory) based on interpolation from the grid of the bottom irregular surface, thereby creating a multipointZ list (212). Interpolating the depth grids for the top and bottom irregular surfaces can be accomplished using art-disclosed methods such as, without limitations, inverse distance weighting, kriging, global and local polynomial interpolation. See, e.g., *Arc View Spatial Analyst*, Environmental Systems Research Institute and *Using ArcGIS Geostatistical Analyst*, Environmental Systems Research Institute.

If the three-dimensional irregular volume is represented in two dimensions by more than one polygon, the estimating step 106 includes unioning of the polygons (not shown). This union of polygons must be exploded into its constituent polygons. The method of exploding unioned polygons representing a single logical entity can be accomplished using art-disclosed methods, See, e.g., *Using Avenue*, Environmental Systems Research Institute, hereby incorporated by reference in its entirety.

4. Clipping Surfaces with Two-Dimensional Polygon

Referring to FIG. 1, the method 100 is further comprised of clipping the estimated irregular surfaces (created in the estimating irregular surfaces step 106) with the estimated at least one two-dimensional polygon (created in estimating two-dimensions polygon step 104) (108). The clipping step 108 is comprised of clipping the extent of each of the top and bottom irregular surface grids to the extent of the at least one two-dimensional polygon representing the lateral boundary of the three-dimensional irregular volume using art-disclosed methods such as ExtractbyPolygon and the like. ExtractbyPolygon is a function accessible within the Avenue programming language developed by ESRI for its GIS platforms. After clipping the top irregular surface, the clipping step 108 also includes converting all points within the top irregular surface grid and the polylineZ representing the boundary of the top irregular surface into a list of multipointZs. This conversion process is also repeated for the bottom irregular surface of the three-dimensional irregular volume. It is preferred that the lists of multipointZs for the top and bottom irregular surfaces are saved into computer memory for later processing.

5. Constructing Multipatches

Referring to FIG. 1, the method 100 is also comprised of constructing multipatches (110), which are networks of triangular panels representing top surface, bottom surface, and sides of the three-dimensional irregular volume to produce the solid three-dimensional irregular volume model within the GIS platform. After the top and bottom irregular surface grids are interpolated, these data are ready for the creation of multipatches for the top, bottom and side surfaces of the polygonal model of the three-dimensional irregular volume. The sub-steps required for the constructing multipatches step 110 are shown in greater diagrammatic detail in FIG. 3.

Figure 3:
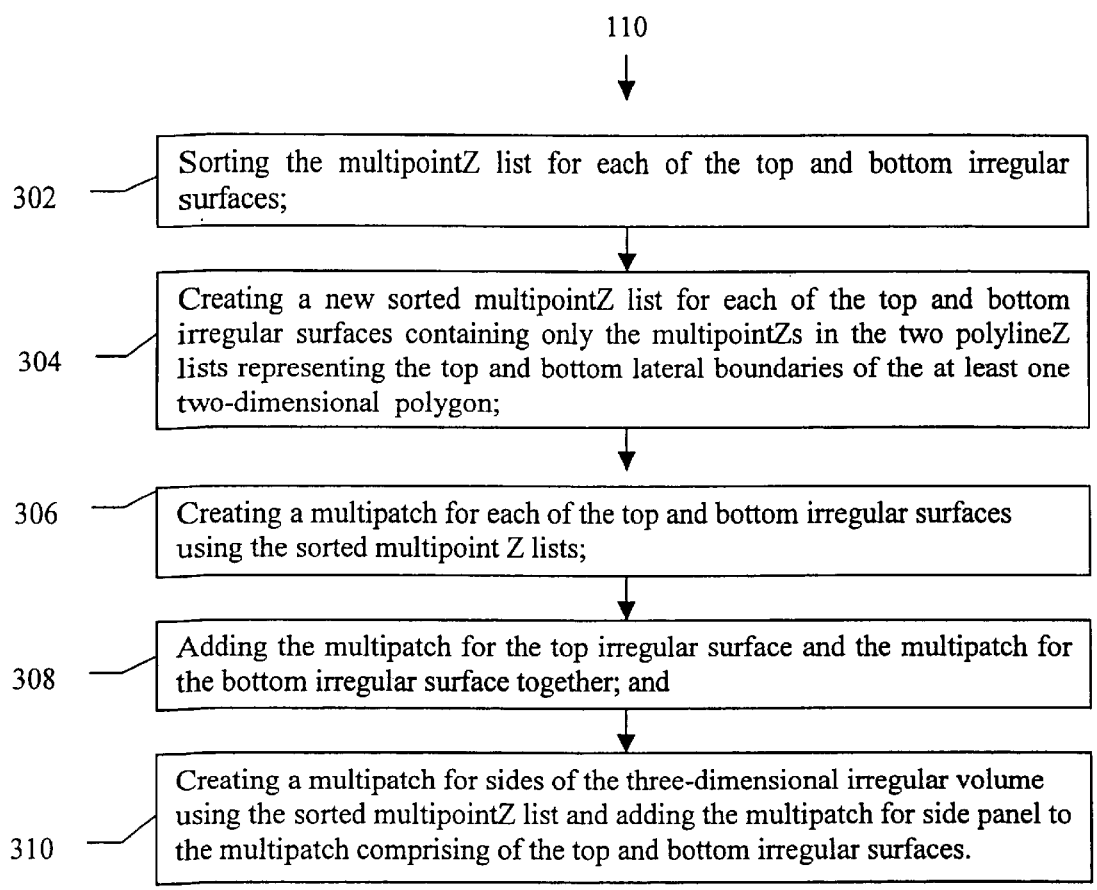
FIG. 3 provides a more detailed diagrammatic view of the constructing multipatches step (110) shown in FIG. 1.
Figure 4:
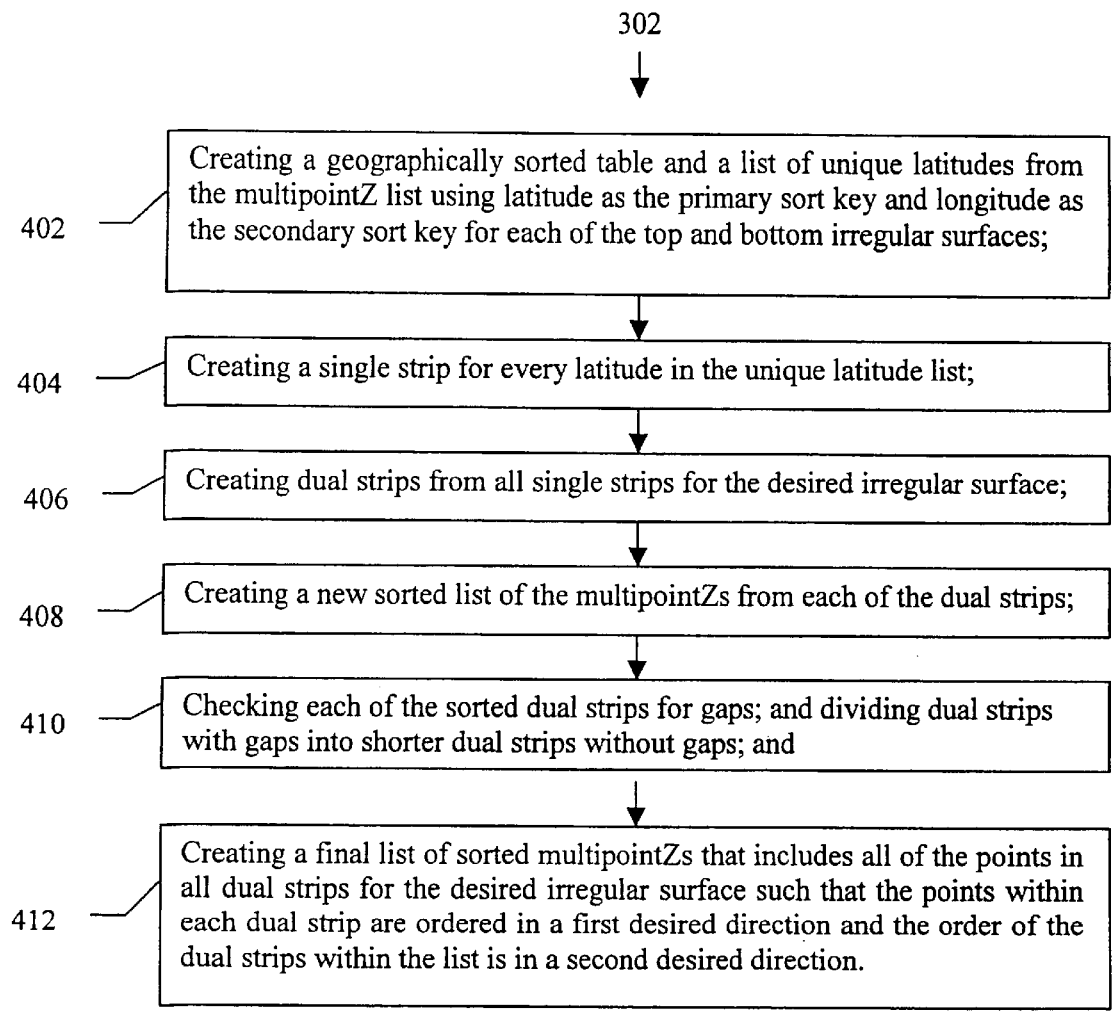
FIG. 4 provides a more detailed diagrammatic view of the sorting sub-step (302) shown in FIG. 3.

Referring to FIG. 3, the constructing multipatches step 110 includes sorting the multipointZ list for each of the top and bottom irregular surfaces (which may be retrieved from computer memory) (302). This sorting sub-step 302 is shown in greater diagrammatic detail in FIG. 4. Referring to FIG. 4, the sorting sub-step 302 is comprised of creating a geographically sorted table and a list of unique latitudes for each of the top and bottom irregular surfaces from the multipointZ list (which may be retrieved from computer memory) using latitude as the primary sort key and longitude as the secondary sort key (402). It is also within the scope of the invention to use longitude as the primary sort key and latitude as the secondary sort key. The table and the list of unique latitudes can be sorted in any desired direction (e.g., north to south, east to west, and the like). However, it is preferred that the table is sorted from south to north and west to east. It is also preferred that the list of unique latitudes is sorted from south to north. The sorting sub-step 302 is further comprised of creating a single strip for every latitude in the unique latitude list (404). The single strip is a new list that contains all points (preferred sorted from west to east) from the sorted multipointZ list for the desired irregular surface (e.g., top or bottom irregular surface) that have the same latitude. It is preferred that each single strip is saved into computer memory for later processing. After creating the single strip, the sorting sub-step 302 includes creating dual strips from all single strips for the desired irregular surface (406). The dual strip is a new list comprising of all multipointZs from a single strip and its immediate neighboring single strip with equal longitude. Dual strips are made from all single strips for the desired irregular surface. Once the dual strips have been created, the sorting sub-step 302 includes creating a new sorted list of the multipointZs from each dual strip (408). This dual strip sorting process can be conducted based in any desired geographic direction. For example, defining "i" as an index for the southern single strip in a dual strip and "j" as an index for the northern single strip in a dual strip. One may start with the south-most dual strip and make the first multipointZ in the sorted list the west-most point in the $i^{th}$ single strip; the second multipointZ in the sorted list is the second west-most point in the $j^{th}$ single strip; and the third multipointZ in the sorted list is the second west-most point in the $i^{th}$ single strip (which will have the same longitude as the second point), etc. Repeat this dual strip sorting process for all points in the south-most dual strip and apply the same sorting process to the next dual strip to the north until all dual strips are sorted into the new multipointZ list. It is preferred that the new dual strip sorted multipointZ list is saved into computer memory for later processing. After sorting the dual strips, the sorting sub-step 302 includes checking each sorted dual strip for gaps (410). A gap can be any desired distance. For example, in one embodiment of the invention, a gap is defined as the distance in the east-west direction with no data that is at least 1.4 times the length of the grid cell calculated in the determining grid parameter sub-step 204. For those dual strips with gaps, divide the dual strip into subset dual strips such that no subset strip has a gap (410). Finally, the sorting sub-step 302 is creating a final list of sorted multipointZs that includes all of the points in all dual strips for the desired irregular surface such that the points within each dual strip are ordered in a desired direction (e.g., from west to east) and the order of the dual strips within the list is in a desired direction (e.g., from south to north) (412). The objective of the sorting sub-step 302 for the top and bottom surface grids is to create a geometrically ordered list of points across the top and bottom surfaces such that, when connected in the creation of multipatches, will produce a dense network of regular triangular panels.

Referring back to FIG. 3, after the sorting sub-step 302, the constructing multipatches step 110 includes creating a new sorted list for each of the top and bottom irregular surfaces containing only the multipointZs in the two polylineZ lists representing the top and bottom lateral boundaries of the at least one polygon (which were created in the estimating two-dimensional polygon step 104) where the latitude and longitude of the points in both lists are equal (304). In this sub-step 304, the new sorted list is sorted in a fashion such that the first element of the list is from the bottom-surface, the second point is from the top surface, the third point is from the bottom surface, having the same latitude and longitude as the second point in the list, and so on. The objective of this sorting sub-step 304 is to create a list from which a network of dense triangular panels can be constructed in the creation of the multipatches for the side of the three-dimensional irregular volume.

Referring to FIG. 3, after the sorting sub-step 304, the constructing multipatches step 110 includes creating a multipatch for each of the top and bottom irregular surfaces using the sorted multipoint Z lists (created in the sub-steps 304 and 412) (306). This multipatch creation process can be conducted using art-disclosed methods. See, e.g., *ArcView 3-D Analyst*, Environmental Systems Research Institute.

After creating a multipatch for each of the top and bottom irregular surfaces (306), the constructing multipatches step 110 includes adding these multipatches together (308). The constructing multipatches step 110 also includes creating a multipatch for sides of the three-dimensional irregular volume using the sorted list of multipointZs (created in the sorting sub-step 304 discussed above) and adding it to the multipatch comprising of the top and bottom irregular surfaces (created in the sub-step 308) (310). It is preferred that the completed multipatch is saved to computer memory for further processing.

If the irregular three-dimensional volume being modeled consists of more than one polygon in two dimensions, the constructing multipatches step 110 includes unioning all of the multipatch solid polygonal models created by the method 100 (not shown). The unioning process can be completed using art-disclosed. See, e.g., *Using Avenue*, Environmental Systems Research Institute.

6. Joining Attribute Data to Model

Referring back to FIG. 1, after the creation of the three-dimensional irregular volume model within the GIS platform, the method 100 further includes joining the attributes (which may be retrieved from computer memory) to the three-dimensional irregular volume model within the GIS platform (112). The spatial records associated with the three-dimensional irregular volume model are joined with the table of attributes for that three-dimensional irregular volume using art-disclosed methods. See, e.g., *Using Avenue*, Environmental Systems Research Institute. This attribute table may contain such variables as described properties of the three-dimensional irregular volume. Such properties could include, without limitations, average concentration of a chemical element or compound within the bounds of the volume (e.g., a pollutant or ore); average physical properties (e.g., temperature, pressure, density, viscosity, acoustic properties, etc) or engineering characteristics (e.g., flow rate of wells, recoverable ore, average rate of recharge), and the like. The three-dimensional volume model(s) and associated attribute data are preferably saved in computer memory for later use.

Using art-disclosed methods, the method 100 may optionally include the step of adding other types of features including, without limitations, two-dimensional structures, polylines, multipoints, grids, raster images, vector data such as that derived from well logs, potential field and seismic techniques, and the like (114—not shown in FIG. 1).

Method to Create a Wire Frame Volume Model

Figure 5:
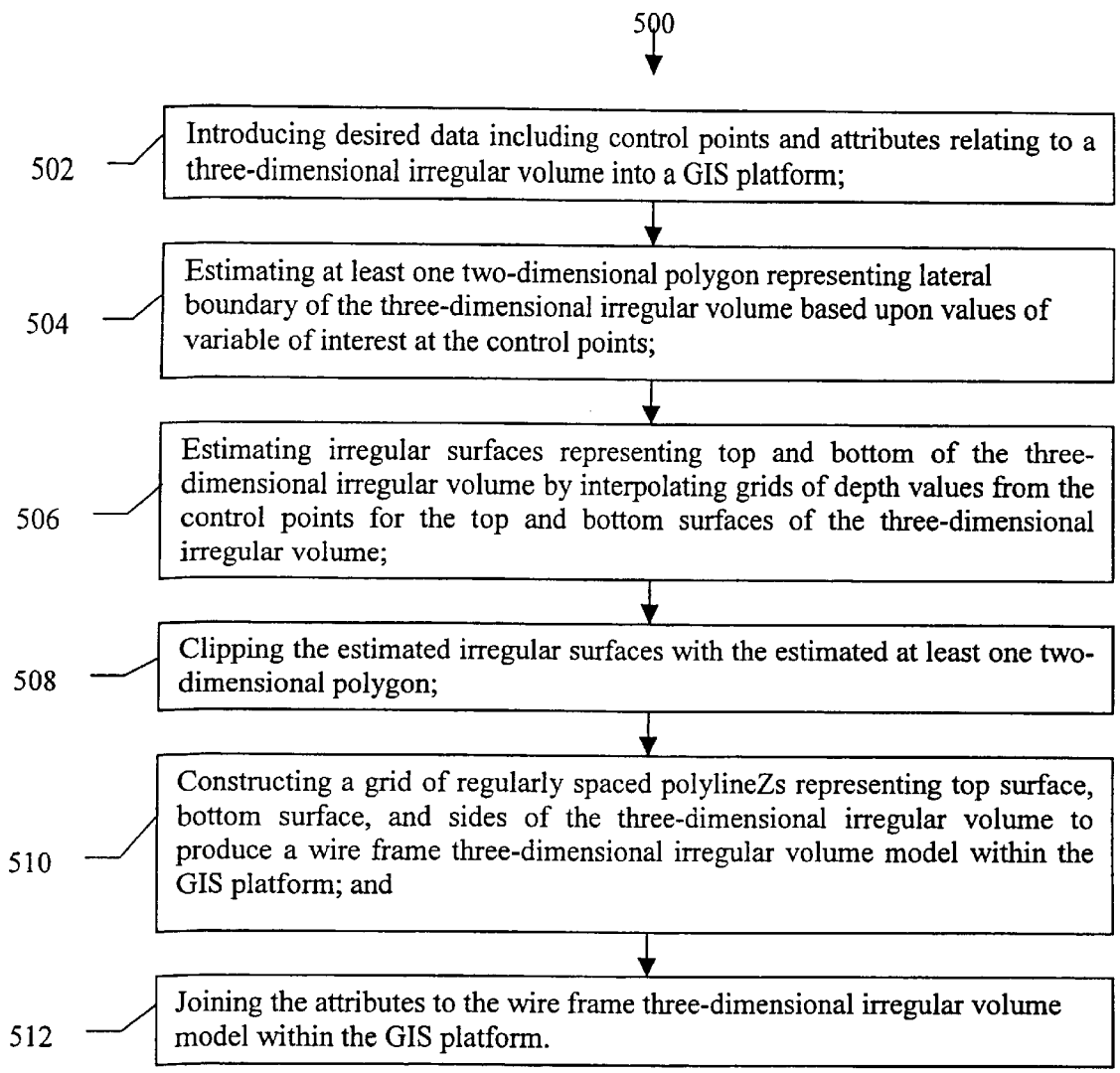
FIG. 5 provides a workflow diagram of a method of the present invention to create a wire-frame three-dimensional irregular volume model within a GIS platform.

In another embodiment of the present invention, a method 500 to create a wire frame model of a three-dimensional irregular volume is provided. Referring to FIG. 5, the method 500 is comprised of the same steps 102, 104, 106, 108, 112 (now known as 502, 504, 506, 508 and 512 respectively) as described above for the method 100 to construct a solid three-dimensional irregular volume model. The only difference between these two methods (500 and 100) is that in the method 500, the step of constructing a grid of regularly spaced polylineZs representing top surface, bottom surface, and sides of the three-dimensional irregular volume to produce a wire frame three-dimensional irregular volume model within the GIS platform (510) replaces the constructing multipatches step 110 described above for the method 100. Accordingly, the method 500 is comprised of: (1) introducing desired data including control points and attributes relating to a three-dimensional irregular volume into a GIS platform (502); (2) estimating at least one two-dimensional polygon representing a lateral boundary of the three-dimensional irregular volume based upon values of variable of interest at the control points (504); (3) estimating irregular surfaces representing top and bottom of the three-Express dimensional irregular volume by interpolating grids of depth values from the control points for the top and bottom surfaces of the three-dimensional irregular volume (506); (4) clipping the estimated irregular surfaces with the estimated at least one two-dimensional polygon (508); (5) constructing a grid of regularly spaced polylineZs representing top surface, bottom surface, and sides of the three-dimensional irregular volume to produce a wire frame three-dimensional irregular volume model within the GIS platform (510); and (6) joining the attribute data to the wire frame three-dimensional irregular volume model within the GIS platform (512).

Figure 6:
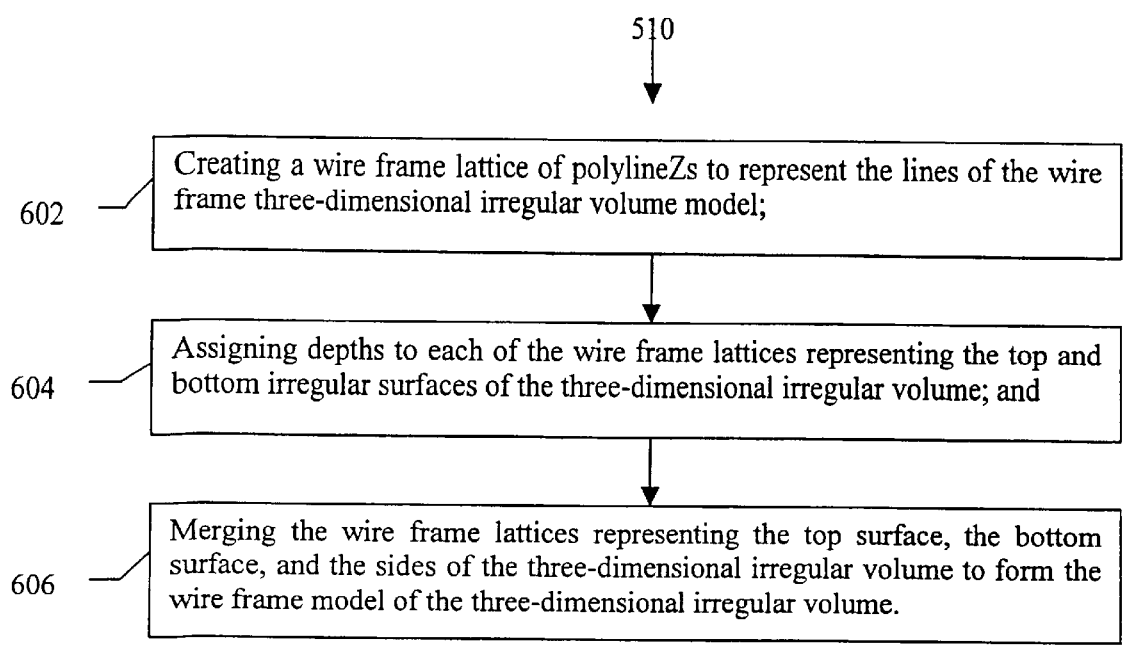
FIG. 6 provides a more detailed diagrammatic view of the constructing a grid of regularly spaced polylineZs step (510) shown in FIG. 5.

Referring to FIG. 6, the constructing a grid step 510 includes creating a lattice of polylineZs to represent the lines of the wire frame three-dimensional irregular volume model (602). The number of lines in both the north-south and east-west directions of the lattice is equal and determined by the user. The distance between lines in the lattice is determined by dividing the number of lines per side into the length of a each side of a bounding rectangle computed by the maximum north, south, east and west values of points in the polylineZ representing the bounding rectangle boundary. The constructing a grid step 510 further includes assigning depths to each of the wire frame lattices representing the top and bottom irregular surfaces of the three-dimensional volume (604). In this sub-step 604, the grid for the top irregular surface (created in the estimating irregular surfaces step 506 [same as the estimating irregular surfaces step 106 described above for the method 100]) is used for assigning depth values to all multipointZs in the polylineZs used to create the top surface wire frame in the step 602. The sub-step 604 includes repeating this same process to assign depths to all lines in the lattice representing the bottom irregular surface. Thereafter, the construction step 510 includes merging the wire frame lattices representing the top, the bottom, and the side(s) of the three-dimensional irregular volume (606) to form the wire frame model of the three-dimensional irregular volume. In this sub-step 606, the polylineZs for the top and bottom irregular surfaces are each unioned with the polylineZs for the lateral boundaries (created in the estimating irregular surfaces step 506 [same as the estimating irregular surfaces step 106 described above for the method 100]) and are then unioned with each other to create a single polylineZ model for the three-dimensional irregular volume.

If there is more than one polygon for the three-dimensional irregular volume as projected into two dimensions, the constructing a grid step 510 also includes repeating the above-described sub-steps 602–606 for all polygons representing the entire multi-part volume, and then unioning these wire frame models together before they are all joined with their attribute data.

Using art-disclosed methods, the method 500 may optionally include the step of adding other types of features including, without limitations, two-dimensional structures, polylines, multipoints, grids, raster images, vector data such as that derived from well logs, potential field and seismic techniques, and the like (514—not shown in FIG. 5).

Figure 7:
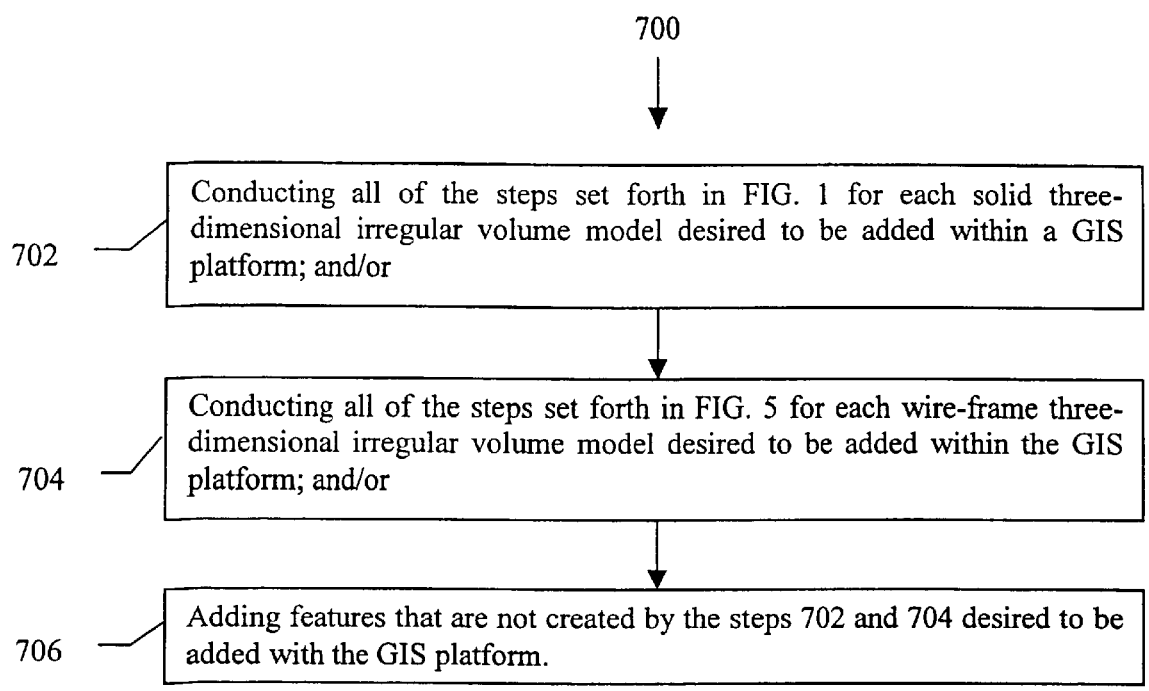
FIG. 7 provides a workflow diagram of a method to create multiple three-dimensional volumes.

Method to Create Multiple Three-Dimensional Irregular Volumes and Other Features Referring to FIG. 7, the present invention also provides a method 700 to create multiple three-dimensional irregular volumes. This method 700 is comprised of repeating the steps described above for the method 100 (702) and/or the steps described above for the method 500 (704) to create multiple and different three-dimensional irregular volume solid and/or wire frame models within a GIS platform. Using art-disclosed methods, the method 700 may also optionally include adding features that are not created by the steps described above for the methods 100 and 500 including, without limitations, two-dimensional structures, polylines, multipoints, grids, raster images, vector data such as that derived from well logs, potential field and seismic techniques, and the like (706).

An Exemplary Preferred Embodiment of the Present Invention

Figure 8:
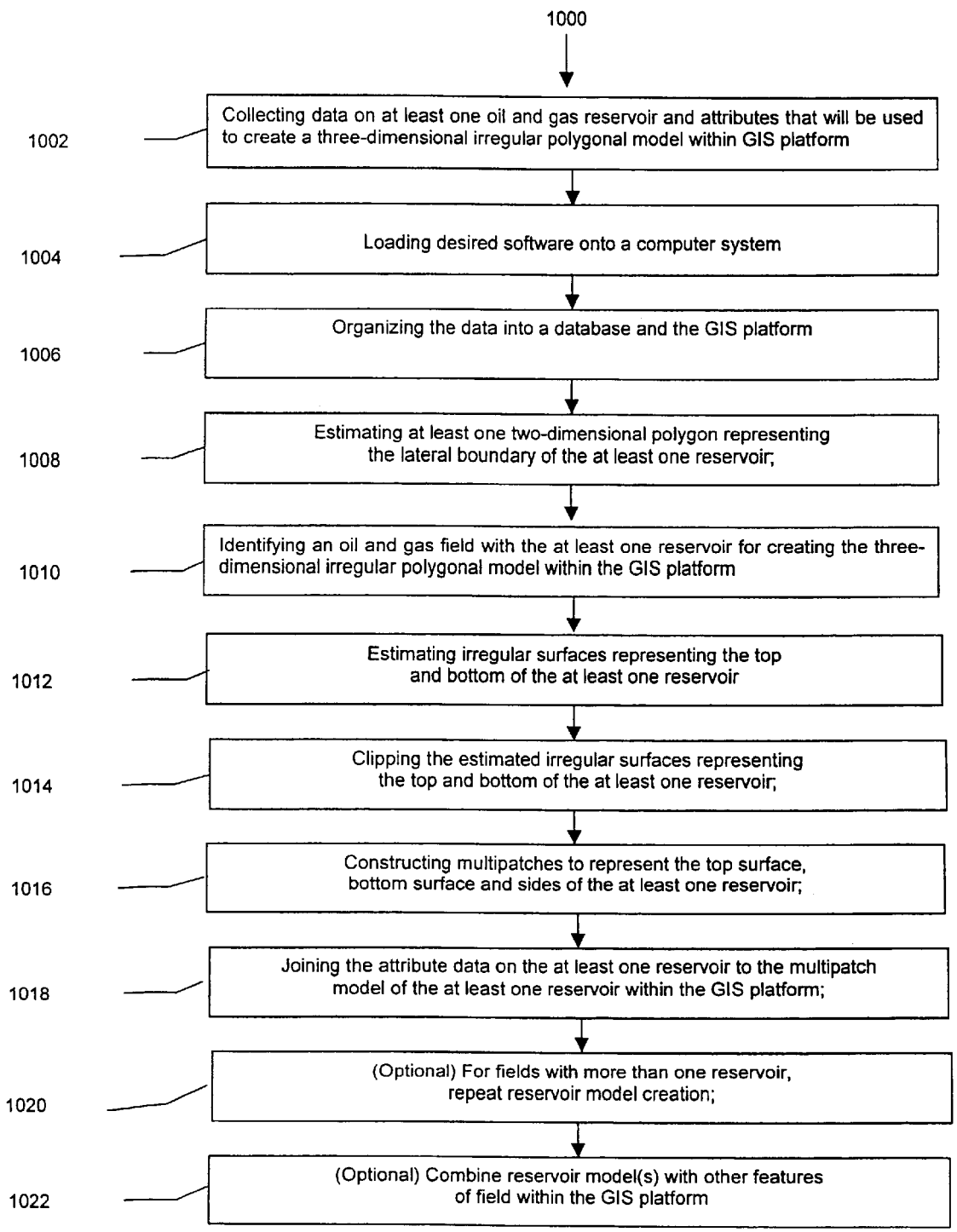
FIG. 8 provides a workflow diagram of a method of the present invention to create a three-dimensional irregular volume of an oil and gas reservoir within a GIS platform.

Referring to FIG. 8, an exemplary preferred embodiment of the present invention is described specifically for the oil and gas field. In this example, the method 1000 of the present invention provides the functionality of GIS systems in three dimensions to geologists, geophysicists, engineers, managers in the oil and gas industry, and others that may desire such geological and engineering information. Specifically, the method 1000 provides users with three-dimensional models of specific oil and gas fields within a three-dimensional GIS system for analysis, visualization and data management. Referring to FIG. 8, the method 1000 is comprised of several steps:

1. Data Collection

The method 1000 includes collecting data on the oil and gas reservoir that will be used in construction of the three-dimensional irregular polygonal model and data on the attributes of the reservoir that will be joined with the model in a GIS platform (1002). Reservoir location data is derived from records kept during the drilling, testing and production of oil and gas wells. When a well is drilled, engineering and geophysical instruments are used to determine the location of the top and bottom of the productive reservoir. These locations are fixed at the points of intersection of the well with the top and bottom reservoir surfaces. These data are recorded in well surveys and well logs and reported on three orthogonal axes. The latitude and longitude of the surface projections of the intersections of the well with the reservoir top and bottom are recorded to define their lateral positions. The true vertical depths of the intersections below a constant datum (typically mean sea level) provides the location on the third dimension for the intersections of the well with the reservoir top and bottom.

Location data defining the intersection of wells and reservoir tops and bottoms are retained by the company drilling the well and its partners and typically reported to government regulatory bodies. Regulatory bodies may either sell or distribute this data freely or a geospatial data vendor may aggregate and organize the data and sell it as a database. Therefore, this data is available to users from internal or external sources.

In addition to the location data on the intersection of the wells with the reservoir tops and bottoms, it is also necessary to collect attribute data on the reservoir as a whole, which will be joined with the reservoir model constructed with this method. Typical attribute data on oil and gas reservoirs includes the volume of oil and gas estimated to exist and be recoverable within the reservoir. It also typically includes the properties of the rock within the bounds of the reservoir (e.g., porosity, permeability and lithology) and the properties of the oil, gas and water that occupies the pore spaces within the reservoir rock (e.g., chemical composition of the oil, gas and water). Attribute data on oil and gas reservoirs is also available in some instances from internal resources, government regulatory agencies or from commercial vendors of oil and gas geospatial data.

Please note that the method 1000 is part of a data and software system called $GOM^3$ made by Earth Science Associates (Long Beach, Calif.). In this example and the $GOM^3$ software system, all location data and attribute data on oil and gas wells and reservoirs in the Gulf of Mexico were obtained from the US Minerals Management Service. The version of $GOM^3$ that is written for ArcView 3.x versions is written in the Avenue programming language. The version of $GOM^3$ written for ArcView 8.x versions is written in the Visual Basic programming language.

2. Loading the Software

In one embodiment, the method 1000 includes loading desired software onto a computer system (1004). The computer hardware components are generally a typical configuration used by scientists, engineers and managers in the oil and gas industry. For example, a Dell Inspiron 8000 computer made by Dell Computer Corporation (Round Rock) Texas can be used. This Dell Inspiron 8000 computer has a 750-megahertz Pentium 111 central processing unit (CPU) made by Intel (Santa Clara, Calif.); a 32-megabyte video random access memory (VRAM), RAGE Mobility 128 AGP 4x video card made by ATI Technologies Inc. (Ontario, Canada); 540 megabytes of random access memory (RAM) and a single 40-gigabyte hard disk for storage. Its operating system is Windows NT 4.0, Service Pack 5, made by Microsoft Corporation (Redmond, Wash.). An additional hardware component that can be used in this embodiment is an HP1200C Color Ink Jet Printer made by Hewlett Packard Corporation.

Examples of the software components of this embodiment include, without limitations, Earth Science Associates' $GOM^3$ system, ArcView 3.2, ESRI's extensions to ArcView, Spatial Analyst 1.1 and 3-D Analyst 1.0 and Personal Oracle 8i, a product of Oracle Corporation (Redwood Shores, Calif.). Alternative ESRI ArcView versions (such as 3.3, 8.2 and 8.3) may also be used. Also alternative versions of Spatial Analyst (e.g., version 2.0 and the ArcGIS version, if ArcView 8.x is being used) and the 3-D Analyst extensions (e.g., 3-D Analyst for ArcGIS, if ArcView 8.x is being used) may also be used. Furthermore, alternative Oracle relational database management systems and alternative versions of Personal Oracle may be used or relational database management systems produced by other companies that may be queried using the SQL programming language and are accessible from ArcView via ODBC. These include, but are not limited to, SQL Server, Visual FoxPro, Access and dBase, all products of Microsoft Corporation. It is preferred that Earth Science Associates' $GOM^3$ system is loaded after loading ArcView, its extensions and Oracle.

3. Organizing the Data

The method 1000 includes organizing the data collected in the step 1002, such as well/reservoir location data, well classification data, reservoir attribute data and the like, into a database and the GIS platform (1006). For example, Earth Science Associates' $GOM^3$ system, the data are organized in ArcView 3.2 GIS platform and Personal Oracle 8i. However, depending on the volume of attribute data associated with the oil and gas fields of interest, it is possible to apply the method using only the database capabilities within the ArcView software. Nevertheless, for efficiency of operation with attribute data sets over 100,000 records, a connection to Personal Oracle 8i is used in the $GOM^3$ system.

4. Estimating Two-Dimensional Polygons Representing the Lateral Boundary of the Reservoir To provide the definition of the lateral boundary of each reservoir to be modeled in three-dimensions, the method 1000 includes estimating at least one two-dimensional boundary polygon (1008). Reservoir outlines can be estimated by the creation of buffers around the wells that produce from the reservoir of interest. When such buffers are estimated, the interior boundaries within the polygon must be dissolved. Creation of buffers and dissolving interior boundaries are standard GIS operations. See, e.g., ESRI's *Arc View GIS*. The at least one two-dimensional boundary polygon for the reservoir can be stored on the computer system's hard disk so that it can be retrieved for later use in the process of the invention. It is preferred that the at least one two-dimensional boundary polygon is converted into polylineZ formats (e.g., polylineZs) for later processing. The conversion of the polygon to the polylineZ preserves only the exterior boundary of the polygon. If the polygon contains interior holes, in a preferred embodiment, interior holes are ignored and only the polylineZ representing the exterior boundary of the polygon is retained.

5. Identifying the Oil and Gas Field of Interest

Figure 9:
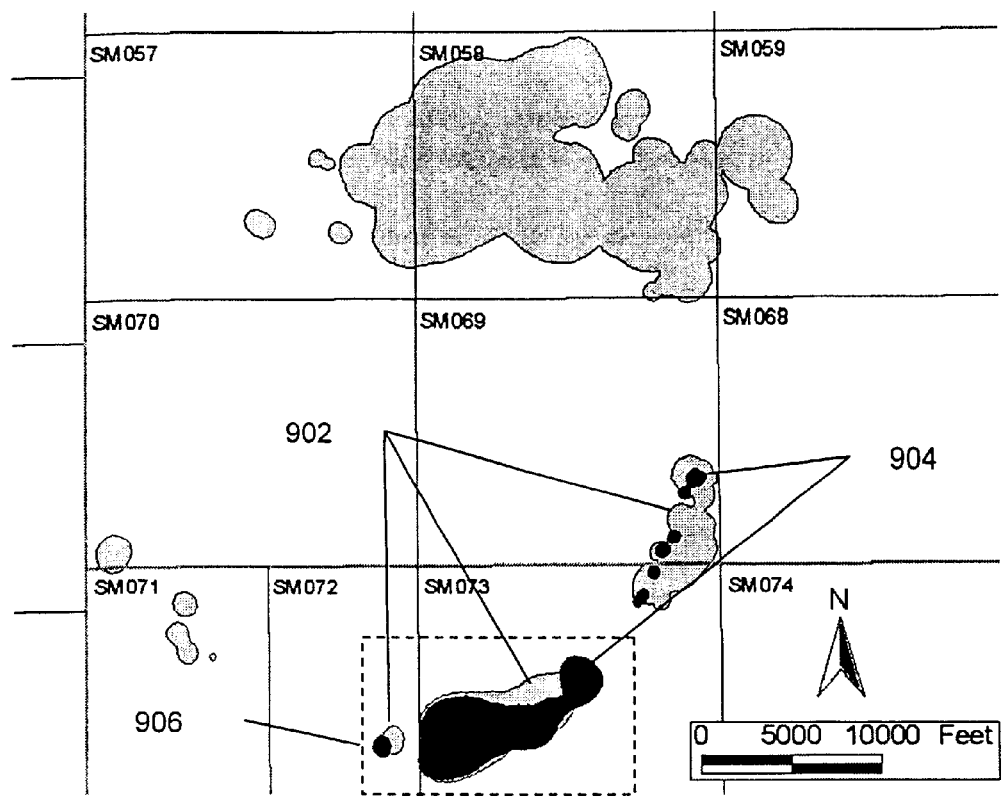
FIG. 9 provides an exemplary map showing how oil and gas fields are typically mapped in a two-dimensional GIS system.
Figure 10:
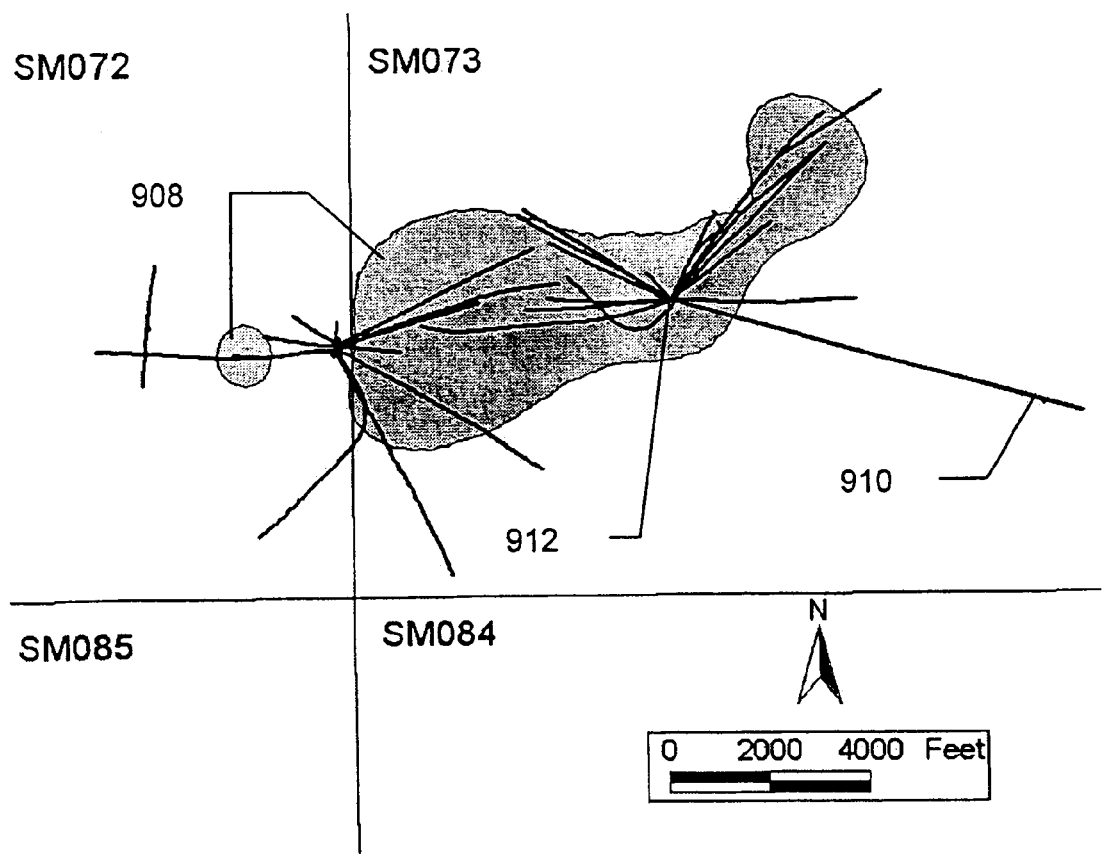
FIG. 10 provides a more detailed exemplary map of a reservoir and associated wells within an oil and gas field mapped in a two-dimensional GIS system.

The method 1000 may also include identifying an oil and gas field with at least one reservoir for creating a three-dimensional irregular volume model within the GIS platform (1010). For example, in the $GOM^3$ system, the user applies a series of choices in menus to add data to the two-dimensional GIS on Gulf of Mexico oil and gas resources. The procedures for this are either standard GIS manipulations or art-disclosed self-evident choices within the $GOM^3$ system. See, e.g., $GOM^3$ *System Documentation and Help*, hereby incorporated by reference in its entirety. Using standard spatial navigation tools in ArcView, the user will geographically restrict the map displayed in the computer monitor to an area of interest. See *ArcView GIS*, Environmental Systems Research Institute, documents the use of standard navigational tools. FIG. 9 shows an example of the type of map that would appear on the computer monitor, once the geographic extent is restricted to the area of interest. The example in FIG. 9 shows the South Marsh Island oil and gas field located offshore under the Outer Continental Shelf of the Gulf of Mexico south of Louisiana. The outline of the productive area of the South Marsh Island field, 902, is shown in light gray. To provide geographic and economic context for the limits of the field and its reservoirs, the boundaries of leases, granted by the US Minerals Management Service and governing the development of oil and gas resources, are shown as a grid of blocks on the map. Within the South Marsh Island field, there is a reservoir named "B35". The productive limits of the "B35" reservoir are shown by black polygons 904 that occur within the boundary of the field (represented by the grey polygons 902). Within the exemplary map represented in FIG. 9, there is an area indicated by a dashed box 906, which is shown in greater detail in FIG. 10. FIG. 10 is an enlargement of the boxed area 906 in FIG. 9. In FIG. 10, the gray polygons 908 represent the productive limits of only the "B35" reservoir (which were shown as black polygons 904 in FIG. 9, to distinguish them from the limits of the entire South Marsh Island field 902, which are not shown in FIG. 10). Also shown in FIG. 10 are the two-dimensional projections of three-dimensional surveys of the tracks of wells drilled into and around the "B35" reservoir 910. At 912 is a point where lines representing wells meet around a platform (not shown) from which those wells were drilled and produced. In FIG. 10, the one well identified with number 910 has a surface location at the end of the line indicated at 912. The other end of the line indicates the surface projection of the longitude and latitude where the well stopped drilling, at this bottom-hole location, the depth of this well was 8,616 feet below mean sea level. The lateral boundary and geometry of the two-dimensional reservoir polygons 908 are estimated based on a model of the area of influence of well completions producing from the reservoir. In this example, the two-dimensional reservoir polygons are included in the data that is part of the $GOM^3$ system. Also included in the data organized in $GOM^3$ are three-dimensional surveys of wells and the points at which they intersect reservoirs.

Figure 11:
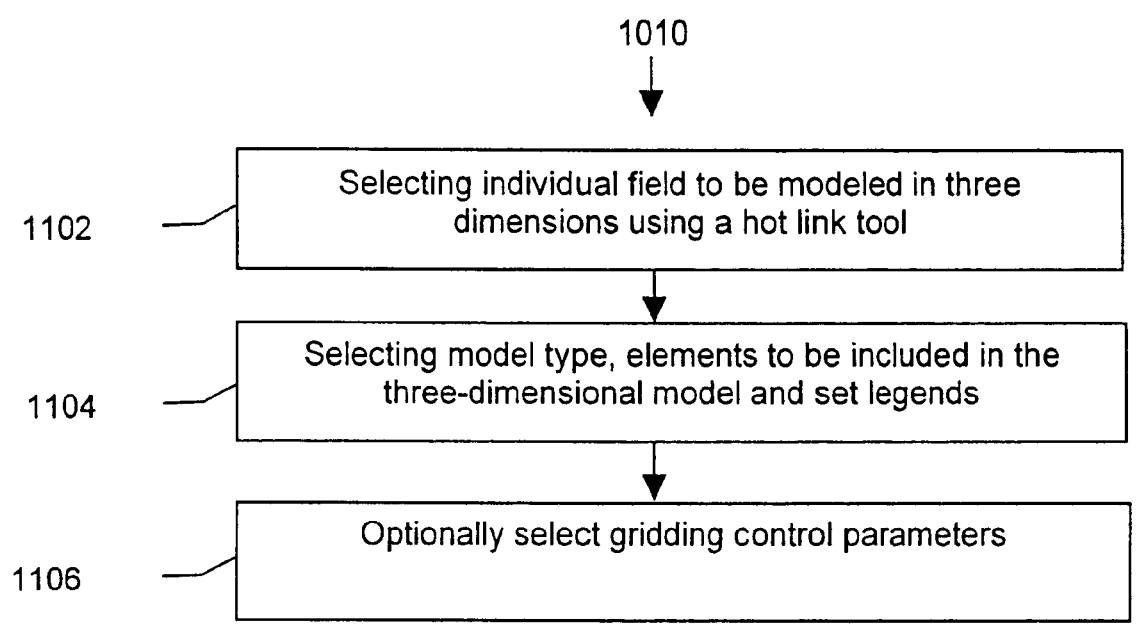
FIG. 11 provides a more detailed diagrammatic view of the identifying the reservoir step (1010) shown in FIG. 8.

The identifying an oil and gas field step 1010 is elaborated in greater diagrammatic detail in FIG. 11. Referring now to FIG. 11, this step 1010 includes allowing a user to click on the field outline (see 902 in the example map in FIG. 9) with a special "hot link" tool (which is part of the art-disclosed graphic user interface of the $GOM^3$ system, see e.g., $GOM^3$ *System Documentation and Help*, Earth Science Associates). After the field to be modeled in three dimensions is chosen with the special hot link tool (1102), the system opens a dialog box that affords the user several options in the application of the method 1000. Thereafter, the user must indicate in the dialog box process whether a solid polygonal model of the reservoir, a wire frame model or both are to be created by the method 1000 (1104). A choice is also made of which elements of the field are to be represented in the three-dimensional model of the field to be displayed within the GIS platform (1104). The user may include wells, well completions, reservoirs, sample points for paleontological data and a graphical reference "cage" that shows the projection of two-dimensional license block boundaries into three dimensions. The user also chooses the attributes of each element by which legends will be constructed for use in display of the three-dimensional model of the field. In a preferred embodiment of the method 1000, the user may include either pre-made three-dimensional models of the field's chosen reservoirs or may generate new three-dimensional reservoir models. If pre-made three-dimensional models are used, they must be created in advance by application of processes of the invention described in batch mode, resulting in the storage of completed models for later use. Running the method 1000 in batch mode as an alternate embodiment of the invention. To enhance the speed of operation, for example, a preferred embodiment of the method 1000 is the $GOM^3$ system which includes a library of pre-made three-dimensional polygonal models of more than 9,000 oil and gas reservoirs from over 1,100 fields in the Gulf of Mexico. These fields are responsible for approximately one-quarter of United States natural gas production and nearly a fifth of oil production. These models were estimated in the batch mode embodiment of the invention and stored on hard disk to improve the speed of creating three-dimensional models of entire fields within a three-dimensional GIS. If the user chooses to generate new three-dimensional reservoir models, the processes of the present invention are used "on-the-fly" to immediately generate the models. In this case, the user can make additional choices on process control parameters that govern construction of the polygonal and wire frame models (1106). These include choices of gridding algorithm such as inverse distance weighting, spline-tension, spline-regularized and the like. For each of these algorithms, the user chooses control parameters specific to the algorithm. These interpolation algorithms and the definitions and roles of their control parameters are art-disclosed. See e.g., *ArcView Spatial Analyst*, Environmental Systems Research Institute. If wire frame models are produced, the user must select the density of the wire frame lattice grid density and in the case of construction of wire frame models, wire (i.e., line) density. For all of these choices in the preferred embodiment, the user may optionally accept default values for the control parameters (1106). When the control parameter selection process is complete, the process begins construction of the chosen models using the steps described below.

6. Estimating Top and Bottom Reservoir Surfaces

Figure 12:
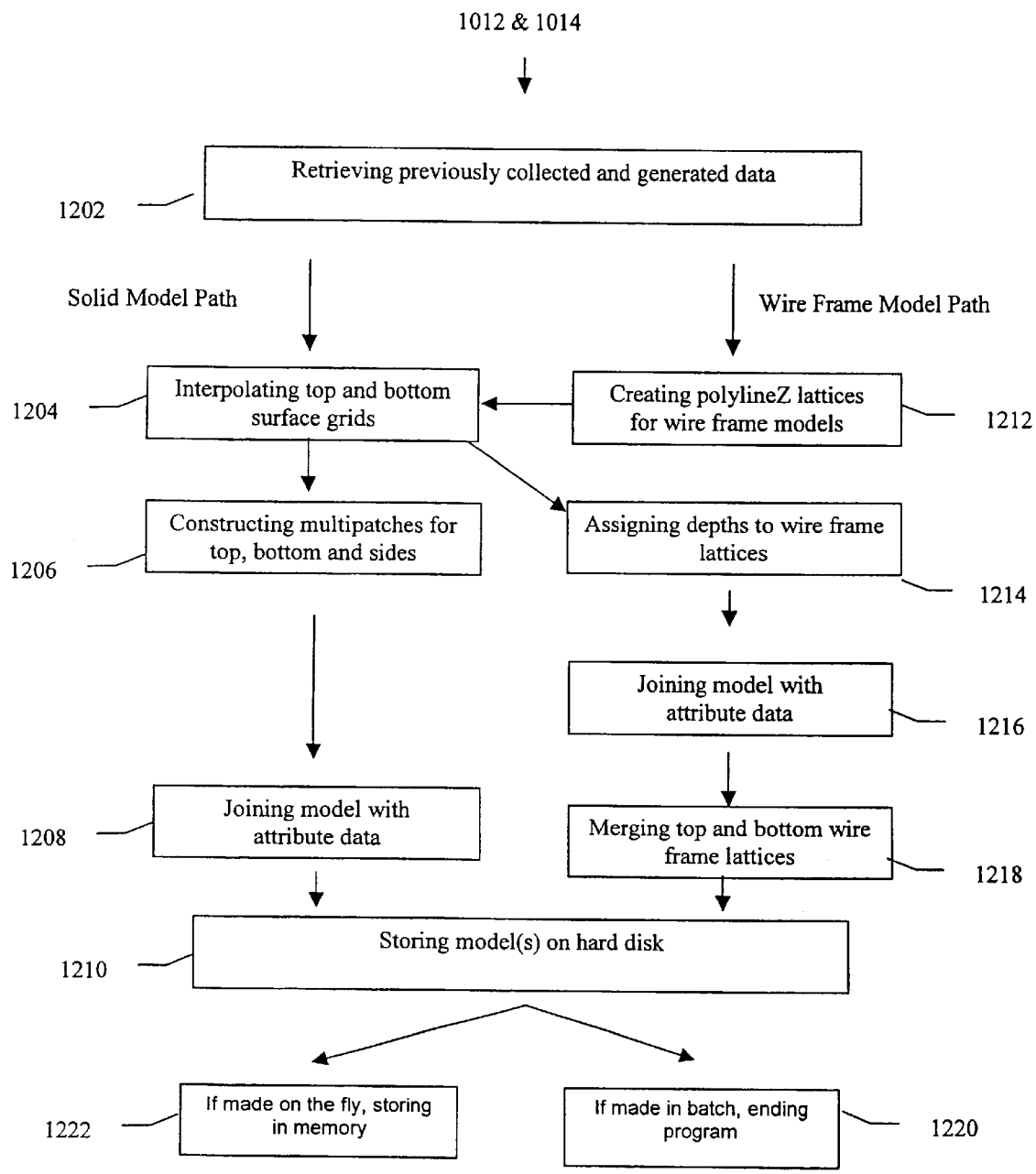
FIG. 12 provides a diagrammatic view of a method of the present invention to create three-dimensional irregular solid polygonal models and wire frame models of oil and gas reservoirs within a GIS platform.

Referring to FIG. 8, the method 1000 includes estimating the reservoir's top and bottom surfaces (1012), which is described in greater diagrammatic detail in FIG. 12. Referring to FIG. 12, in order to estimate the top and bottom reservoir surfaces from the control points, the estimating the reservoir's top and bottom surfaces includes retrieving the control parameters entered in the step 1010; the location data on well-reservoir intersections that was collected in the step 1002, loaded onto the computer system in the step 1004 and organized in the step 1006; and the reservoir's lateral boundary polygons created in the step 1008 (1202). It is preferred that the reservoir boundary polygon data is now in polylineZ format.

Whether the user chooses to create a solid model or wire frame model, or both, the grid cell density chosen for interpolation of the top and bottom surfaces of the reservoir is retrieved from memory, as well as the type of interpolation algorithm used for estimating the top and bottom surfaces. For wire frame models, the line lattice density is also retrieved.

If the chosen reservoir is represented in two dimensions by more than one polygon (as shown in FIG. 9 by the several black polygons 904 representing the "B35" reservoir), the estimating the reservoir's top and bottom surfaces step 1012 also includes exploding the polygons into their constituent polygons. The method of exploding polygons representing a single logical entity is art-disclosed. See, e.g., *Using Avenue*, Environmental Systems Research Institute. The following processes apply to a single polygon. They are repeated for reservoirs with more than one polygon.

For all wells intersecting the reservoir, the three-dimensional control point locations of the intersections of the wells with the top and bottom reservoir surfaces are converted to multipointZs.

Figure 13:
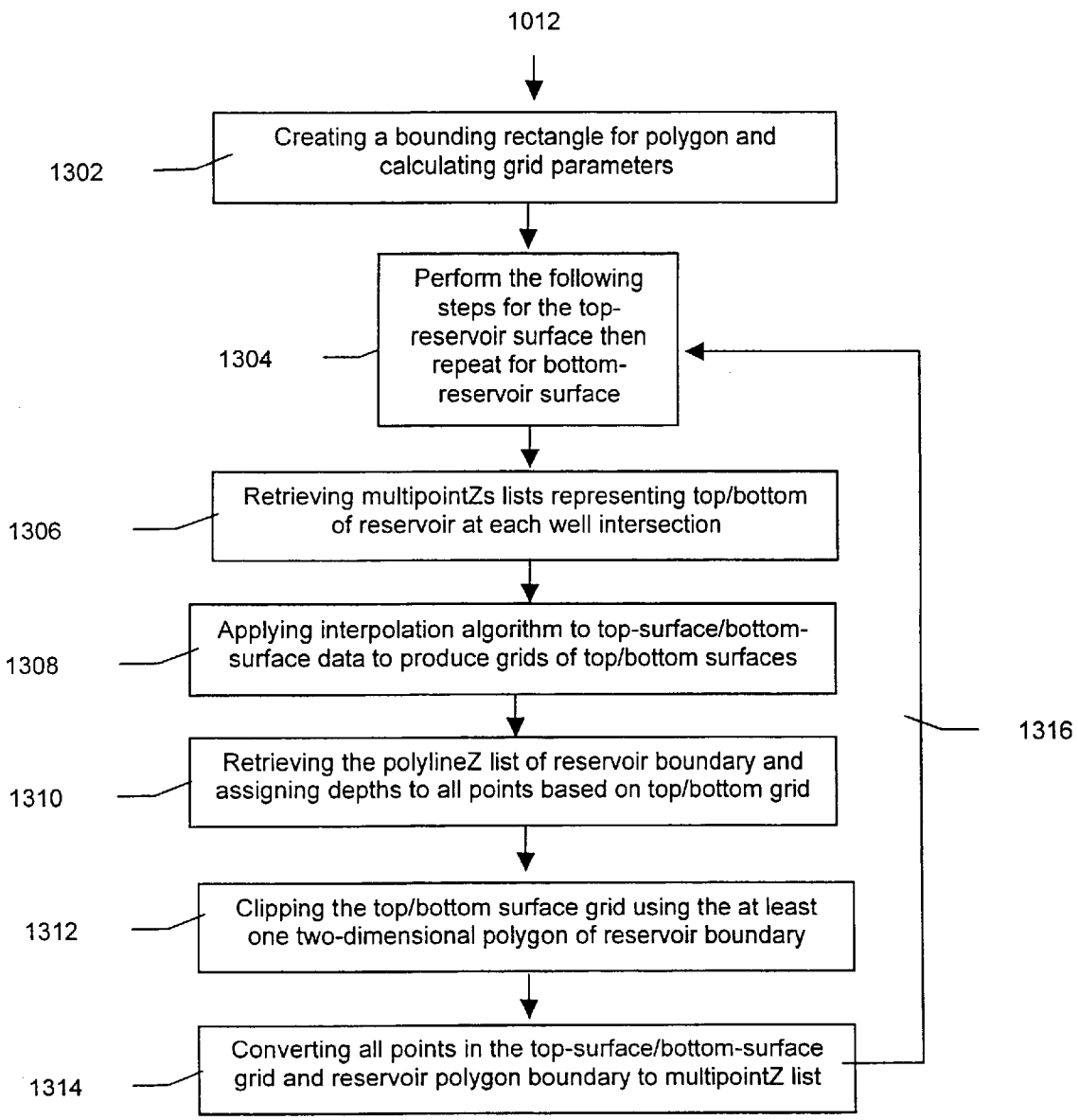
FIG. 13 provides a more detailed diagrammatic view of the estimating top and bottom reservoir surfaces step (1012) shown in FIG. 8.

Whether the user chooses to generate either a solid polygonal model or a wire frame model of the reservoir, the estimating the reservoir's top and bottom surfaces step 1012 includes interpolating the top and bottom surfaces of the reservoir (1204), which is shown in greater diagrammatic detail in FIG. 13.

Referring now to FIG. 13, interpolating the top and bottom surfaces of the reservoir sub-step 1206 includes computing a bounding rectangle for the reservoir boundary polygon based on the maximum north, south, east and west points in the polylineZ representing the reservoir boundary, and then, using grid density parameters stored in memory and the size of the bounding rectangle, the numbers of cells on each side of the grid are determined by division (where a cell side length equal to the length of the parallel side of the bounding rectangle divided by the number of cells to a side) (1302). Thereafter, the interpolating the top and bottom surfaces of the reservoir sub-step 1206 includes executing the following steps for each of the top surface and bottom surfaces of the reservoir (1304). The steps include retrieving from memory all of the multipointZs representing the control points for the top reservoir surface (1306); applying the chosen interpolation algorithm to the multipointZs representing the top reservoir surface (1308). The process of grid interpolation is art-disclosed. See, e.g., *ArcView Spatial Analyst*, Environmental Systems Research Institute. This will return a grid of values, with a geographic extent equal to the bounding rectangle. Each point in the grid is located by latitude, longitude and estimated true vertical depth of the top reservoir surface in feet below mean sea level at that grid point. The steps also include retrieving from computer memory the polylineZ (created in the sub-step 1204 and representing the reservoir boundary) and assign depth values to all points in the polylineZ based on interpolation from the grid of the top-reservoir surface (1310). This creates a mulitpointZ list.

7. Clipping the Surfaces with the Polygons

Referring to FIG. 13, a present preferred method may also include retrieving from memory the at least one two-dimensional polygon representing the reservoir boundary and clip the extent of the grid (created in the sub-step 1206) to the extent of the reservoir boundary polygon using art-disclosed methods such as ExtractbyPolygon and the like (1014, 1312). See, e.g., *ArcView Spatial Analyst*, Environmental Systems Research Institute. The step 1014 may also include converting all points within the top reservoir surface grid and the polylineZ representing the boundary of the top reservoir surface into a list of multipointZs (1314). It is preferred that this list of multipointZs is saved into computer memory.

As noted above, when the steps 1306 through 1314 are completed for the top reservoir surface, then these same steps are repeated for the bottom reservoir surface (1316). However, it is within the scope of the present invention to complete sub-steps 1306 through 1314 first for the bottom reservoir surface and then for the top reservoir surface, or to perform another suitable sequence.

8. Constructing Multipatches

Figure 14:
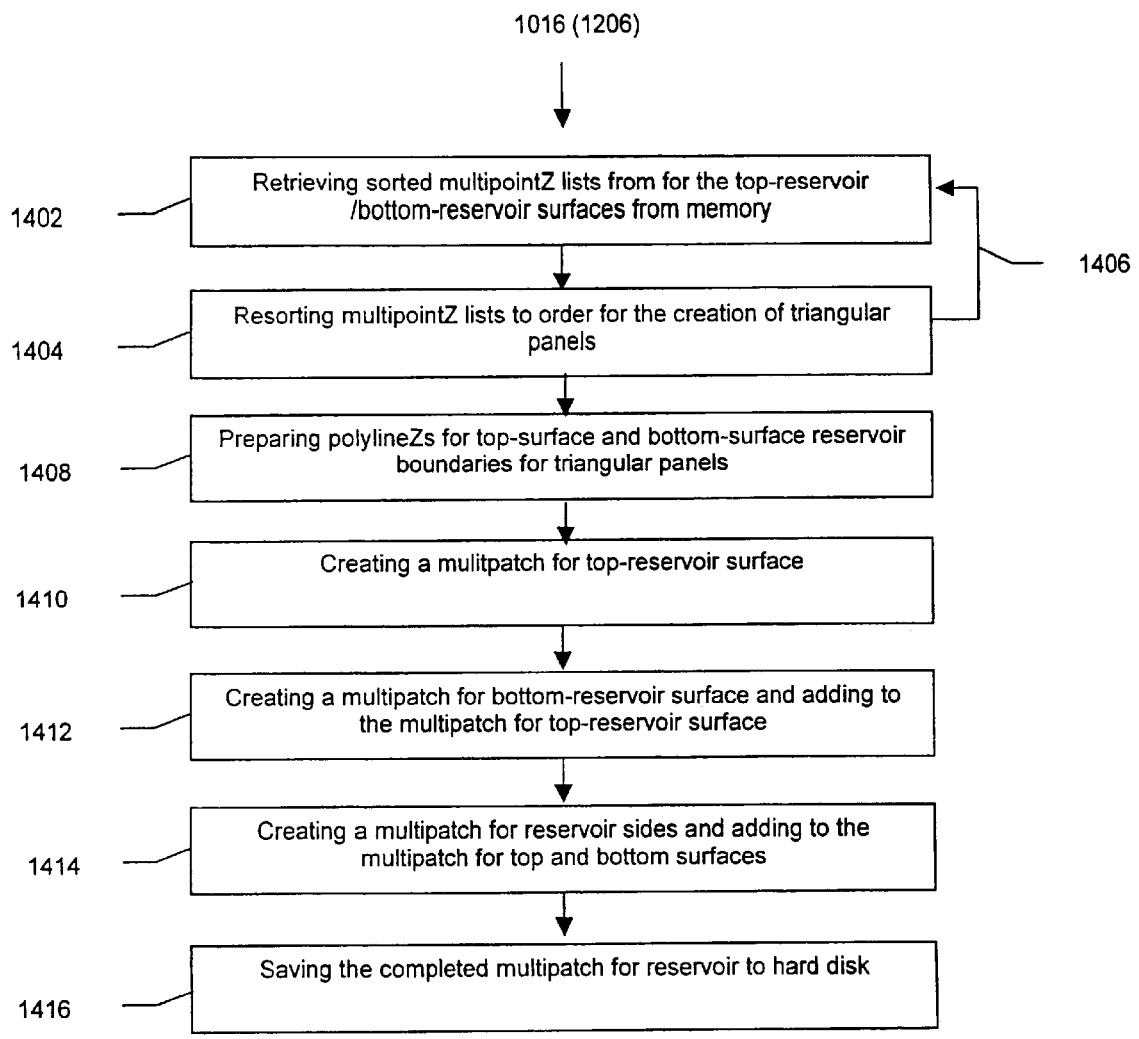
FIG. 14 provides a more detailed diagrammatic view of the constructing multipatches step (1016) shown in FIG. 8.

Referring again to FIG. 8 and FIG. 12, the method 1000 includes constructing multipatches (1016, 1206). After the top and bottom surface grids are interpolated, these data are ready for the construction of multipatches for the top, bottom and side surfaces of the polygonal model of the reservoir (1016, 1206). The constructing multipatches step 1016, 1206 is shown in greater diagrammatic detail in FIG. 14. Referring to FIG. 14, the constructing multipatches step 1016, 1206 includes retrieving the multipointZ list (created in the step 1314) for the top-reservoir surface (1402). The constructing multipatches step 1016, 1206 also includes sorting the multipointZ list (1404), which is shown in greater diagrammatic detail in FIG. 15.

Figure 15:
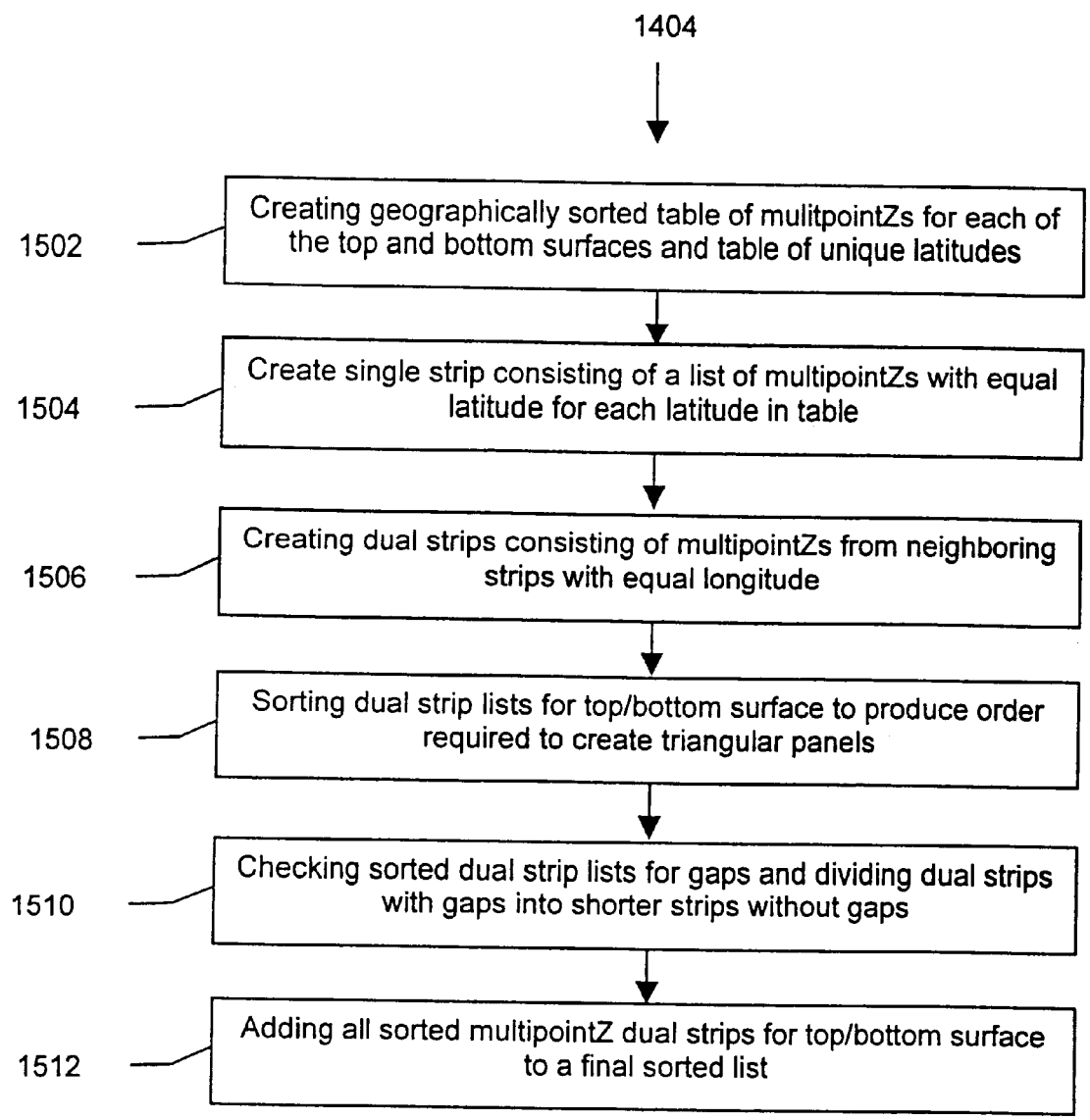
FIG. 15 provides a more detailed diagrammatic view of the sorting sub-step (1404) shown in FIG. 14.

Referring to FIG. 15, the sorting the multipointZ list step 1404 includes creating a sorted table from the multipointZ list (created in the sub-step 1402 and may be retrieved from computer memory) using latitude as the primary sort key and longitude as the secondary sort key (1502) and creating a list of unique latitudes in the list, preferably sorted from south to north (but can be done from north to south if desired) (1502). The table can be sorted in any geographical direction. However, it is preferred that the table is sorted from south to north and west to east. For every latitude in the sorted latitude list created in the step 1502, the sorting the multipointZ list step includes creating a new list that contains all points from the sorted multipointZ list for the top-reservoir surface that have the same latitude (1504). This list is called a single strip. It is preferred that each single strip list is sorted so that it is ordered from west to east. However, each single strip list can be sorted from east to west if desired. It is preferred that these single strip lists are saved into computer memory for later processing. The sorting the multipointZ list step 1404 further includes creating a dual strip (1506). A dual strip is created from a single strip and the single strip located immediately to its north (or south). The dual strip multipointZ list consists of all multipointZs in both constituent single strips that have equal longitudes. Dual strips are made from all single strips for the surface. The sorting the multipointZ list step 1404 includes creating a new sorted list of the multipointZs from each dual strip (1508). The sorting can be conducted based upon any geographical direction. For example, define i as an index for the southern single strip in a dual strip and j as an index for the northern single strip in a dual strip. Start with the south-most dual strip. Make the first multipointZ in the sorted list the west-most point in the $i^{th}$ single strip. The second multipointZ in the sorted list is the second west-most point in the $j^{th}$ single strip. The third multipointZ in the sorted list is the second west-most point in the $i^{th}$ single strip (which will have the same longitude as the second point). Repeat this sorting for all points in the south-most dual strip and apply the same sorting to the next dual strip to the north until all dual strips are sorted into the new multipointZ list. It is preferred that the final sorted list is saved into computer memory for later processing. The sorting the multipointZ list step 1404 also includes checking each sorted dual strip for gaps (1510). A gap can be of any desired distance. For example, in a preferred embodiment, the gap is defined a distance in the east-west direction with no data that is at least 1.4 times the length of the grid cell. For those dual strips with gaps, divide the dual strip into subset dual strips such that no subset strip has a gap. The sorting the multipointZ list step 1404 further includes creating a final list of sorted multipointZs list that includes all of the points in all dual strips for the top-reservoir surface such that the points within each dual strip are ordered west to east (or east to west) and the order of the dual strips within the list is from south to north (or north to south) (1512).

Referring back to FIG. 14, the constructing multipatches step 1016, 1206 includes repeating the processes described in steps 1402 and 1404 for the bottom reservoir surface (1406). The objective of the sampling and sorting of the top-reservoir and bottom-reservoir surface grids is to create a geometrically ordered list of points across the top-reservoir and bottom-reservoir surfaces such that, when connected in the creation of multipatches, will produce a dense network of regular triangular panels.

The constructing multipatches step 1016, 1206 includes retrieving the polylineZs for the top and bottom boundaries of the at least one reservoir polygon that were created in the step 1008 (which may be stored in computer memory) and creating a sorted list such that the members of the list includes only the multipointZs in the two polylineZ lists where the latitude and longitude of the points in both lists are equal (1414). Sort this list such that the first element of the list is from the bottom-reservoir boundary, the second point is from the top-reservoir boundary, the third point is from the bottom-reservoir boundary, having the same latitude and longitude as the second point in the list, and so on. The objective of this sorting is also to create a list from which a network of dense triangular panels can be constructed in the creation of the multipatches.

Using the sorted multipointZ list created in the sub-step 1512, the constructing multipatches step 1016, 1206 includes creating a multipatch for the top-reservoir surface using art-disclosed methods. See, e.g., *ArcView 3-D Analyst*, Environmental Systems Research Institute (1410). After completion of the multipatch for the top-reservoir surface, the constructing multipatches step 1016, 1206 includes creating a multipatch for the bottom-reservoir surface using the sorted multipointz list created in the sub-step 1512 and adding it to the top-reservoir surface multipatch created in the sub-step 1410 (1412). After addition of the bottom-reservoir multipatch to the top-reservoir multipatch, the constructing multipatches step 1016, 1206 includes creating a multipatch for the reservoir sides using the sorted list of multipointZs created in the sub-step 1408 and adding it to the multipatch consisting of the top-reservoir and bottom-reservoir surfaces (1414). It is preferred that the completed multipatch is saved into computer memory for later processing or use (1416).

Returning to FIG. 12, if the reservoir consists of more than one polygon in two-dimensions, the sub-step 1208 includes unioning all the multipatch solid polygonal models in the reservoir. This unioning process can be conducted using art-disclosed methods. See, e.g., *Using Avenue*, Environmental Systems Research Institute.

9. Creating an Optional Wire Frame Model

Referring to FIG. 12, if the user chooses to generate wire frame models, then the method 1000 includes the additional step of creating a lattice of polylineZs to represent the lines of the wire frame model (1212) before the sub-step 1204. After the sub-step 1204, the method 1000 includes assigning depths to the wire frame lattice (1214). In the sub-step 1214, the grid for the top-reservoir surface created in the sub-step 1204 is used for assigning depth values to all multipointZs in the polylineZs used to create the top-reservoir wire frame lattice in the sub-step 1212. This process is repeated to assign depths to all lines in the lattice representing the bottom-reservoir surface. The number of lines in both the north-south and east-west directions of the lattice is equal and determined by the user. The distance between lines in the lattice is determined by dividing the number of lines per side into the length of a each side of a bounding rectangle computed by the maximum north, south, east and west values of points in the polylineZ representing the reservoir boundary. The method 1000 further includes the sub-step of unioning the polylineZs for the top-reservoir and bottom-reservoir surfaces with the polylineZs for the reservoir boundaries created in the sub-step 1204; and thereafter, unioning with each other to create a single polylineZ model for the reservoir (1216). In the sub-step 1216, if there is more than one polygon for a reservoir in two dimensions, the process of wire frame model creation is repeated for all polygons in the reservoir. These wire frame models are then unioned.

10. Joining the Reservoir Models to Attribute Data

Referring again to FIG. 8 and FIG. 12, whether the reservoir model is a solid model 1208 or a wire frame model 1218, after all of the models for a single reservoir are unioned, the method 1000 includes joining the reservoir model(s) with attribute data (1018, 1208, 1218). The spatial records associated with the unioned reservoir are joined with the table of attributes for that reservoir. This attribute table may contain such variables as average porosity, volume of oil reserves, production for a specified year, and the like. The reservoir model(s) and associated attribute data are then preferably saved to computer memory (e.g., stored on a hard disk) (1210). If the process has been executed "on the fly" then the model and attribute data is also stored in memory for further use (1222). If in an alternative embodiment, the process of the invention is executed in batch, the program ends (1220).

11. Repeating Process for Fields with More than One Reservoir

Referring again to FIG. 8, if the field chosen in the step 1010 has more than one reservoir, then the method 1000 includes repeating the steps 1012–1018 to create all remaining reservoirs in the field (1020).

12. Combining Reservoir Models with Other Related Data

Referring again to FIG. 8, the method optionally includes combining three-dimensional irregular volume reservoir models with other related data such as other reservoirs within a selected field, three-dimensional models of the wells and their completions (equipment in the well through which oil, gas and water are produced from the reservoir rock to the well), and other features (1022).

The three-dimensional irregular volume reservoir model(s) and other related data created by the method 1000 can be displayed on a monitor that is part of the system of the present invention. Once the three-dimensional models of the reservoirs, wells and other features are displayed within the GIS platform, they can be queried for data or used in either spatial analysis internal to the GIS or through the execution of GIS-linked programs. For instance, all of the monthly oil and gas production data on a specific well could be exported from GOM$^3$ to an external program like Excel, a product of the Microsoft Corporation, for further analysis. Execution of element-linked programs described herein is accomplished using art-disclosed methods. See e.g., GOM$^3$ *System Documentation and Help*, Earth Science Associates. The GIS platform also allows the field model to be rotated, panned and zoomed in and out to study the model from various geometric perspectives. These three-dimensional navigation tools and operations are art-disclosed. See e.g., *ArcView 3-D Analyst*, Environmental Systems Research Institute. Because the data are in a GIS, the features within the 3-D scene can be optionally subsetted by the user based on logical or spatial criteria (e.g., show only fields with reserves exceeding a certain value, show only wells that penetrate a specific reservoir). It is also possible to change legend parameters to highlight specific values of feature attributes. Subsetting features on the basis of logical and/or spatial criteria or relegending requires a refresh of the information on the computer monitor. Once scenes of interest are displayed on the computer monitor, it is possible to create stored images on hard disk, CD, DVD or other devices or hard copy images using color printers.

Figure 16:
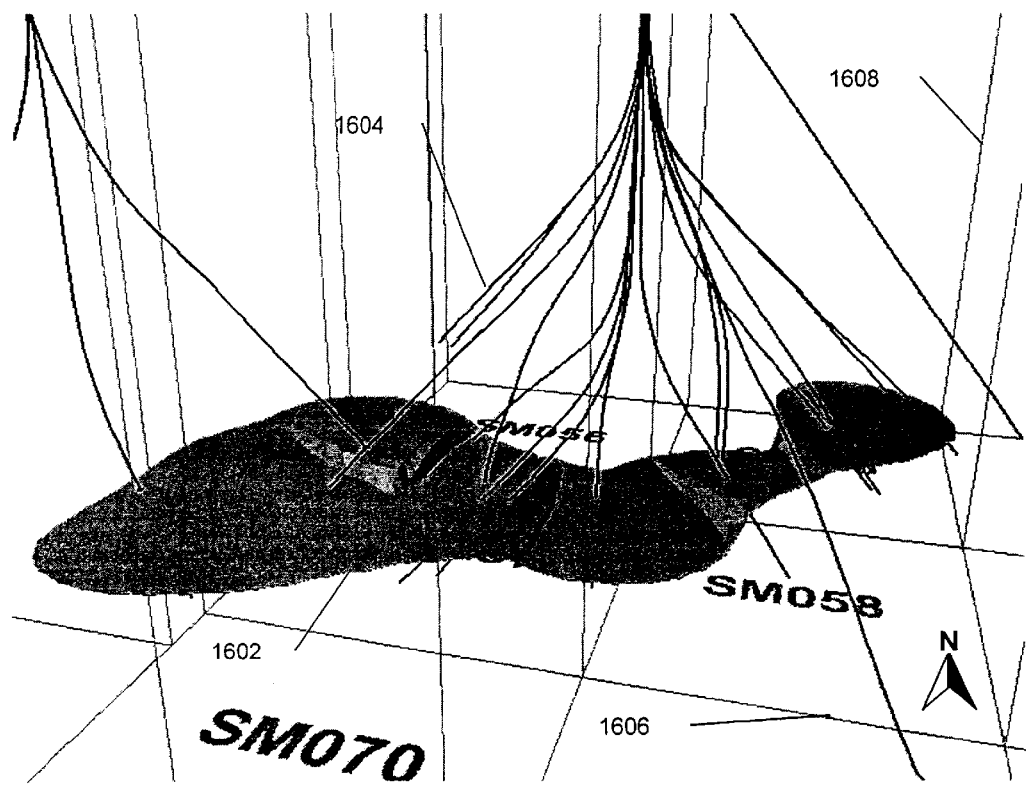
FIG. 16 provides an illustration of one example of a three-dimensional solid polygonal model of the "B35" reservoir and associated wells within the South Marsh Island oil and gas field in a three-dimensional GIS system.

An example of an output of the method 1000 is provided in FIG. 16. FIG. 16 shows part of the three-dimensional model of the South Marsh Island 73 oil and gas field (shown in two dimensions in FIG. 9 and FIG. 10). The elements of the model include a three-dimensional irregular solid polygonal model of the "B35" reservoir 1602. The three-dimensional surveys of the oil and gas wells are shown as dark black lines, 1604. Surrounding the three-dimensional scene is a graphic "cage" representing the boundaries of surrounding lease blocks projected down in depth 1606. The bottom of the cage is at a depth of 25,000 feet below mean sea level. Vertical lines 1608 indicate the corners of two-dimensional lease boundaries.

The top surface of the "B35" reservoir is at approximately 5,900 feet below mean sea level. The depth of the reservoir changes systematically across its lateral boundary. These changes in the depth of the surface, reflected in the polygon geometry 1602, are illuminated by changes in shading, which produce variations in gray across the polygon top surface (from very light gray for southwest facing surfaces to dark gray in the shadows created on east facing surfaces).

Figure 17:
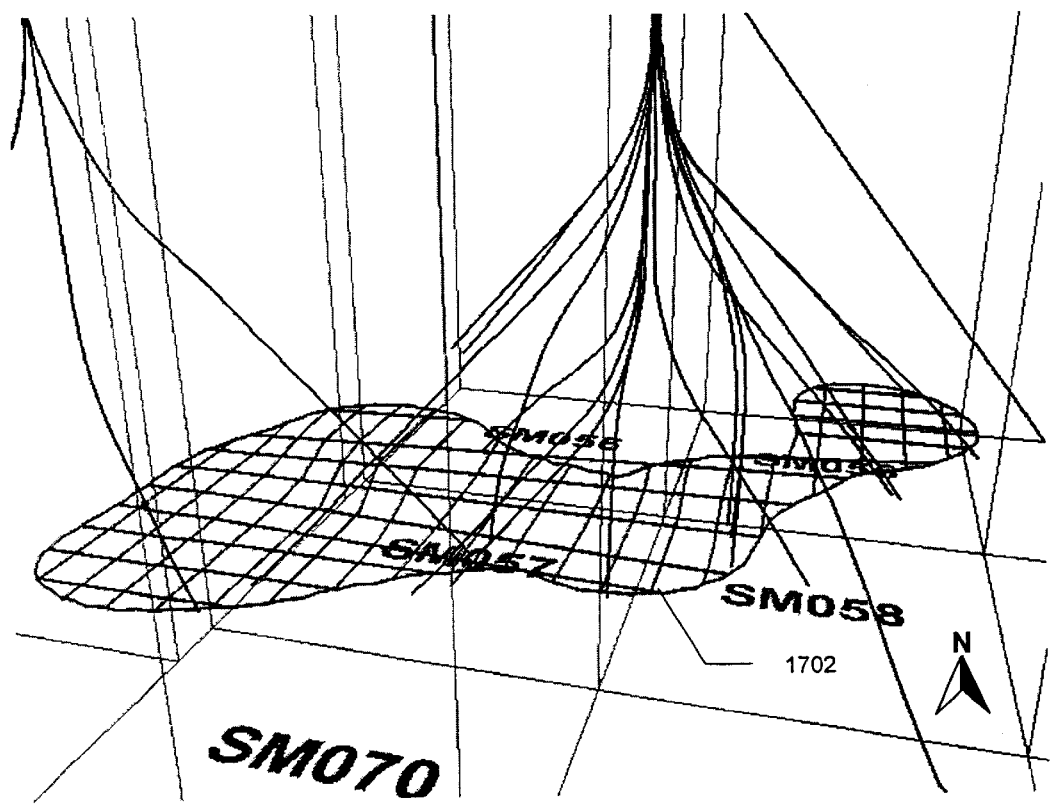
FIG. 17 provides an illustration of one example of a three-dimensional wire frame polygonal model of the "B35" reservoir and associated wells within the South Marsh Island oil and gas field in a three-dimensional GIS system.

FIG. 17 shows the same three-dimensional scene as FIG. 16 except that the wire frame method has been applied to creation of the reservoir model. The wire frame model 1702 has the advantage of over the solid model of allowing the user to see into the reservoir and through it to elements that are behind it. The wire frame model has a disadvantage relative to the solid model that it does not reflect the vertical structure of the top-reservoir and bottom-reservoir surfaces with as great a resolution as the solid model.

Figure 18:
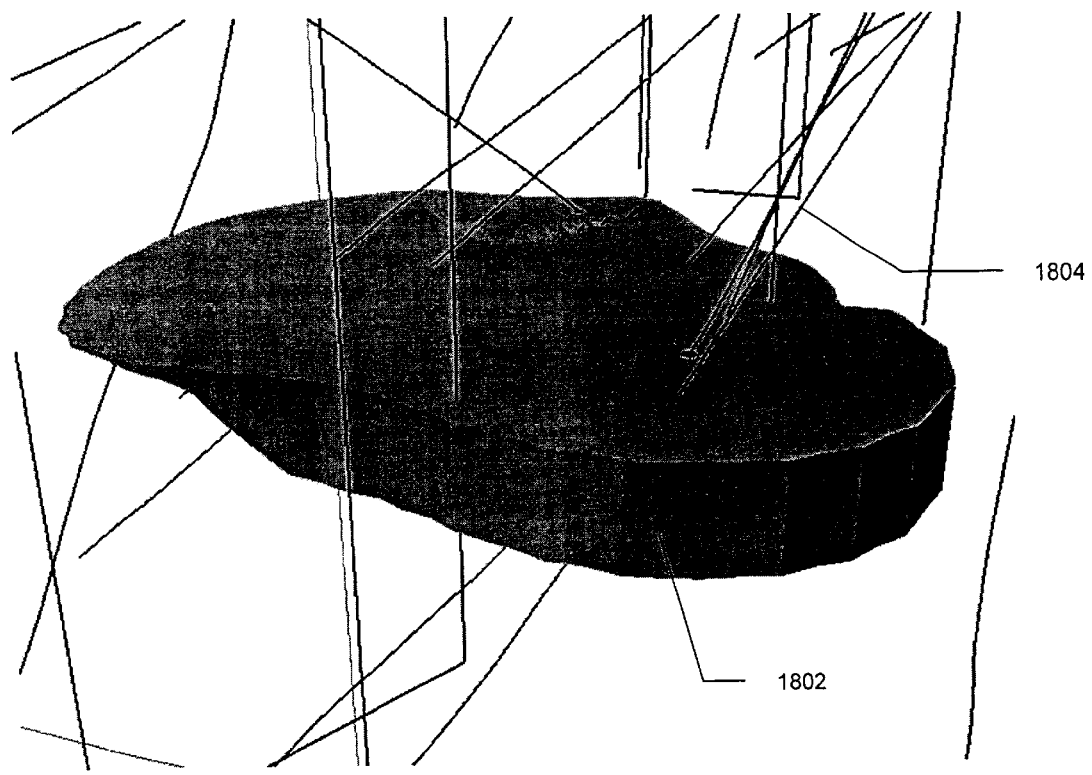
FIG. 18 illustrates one example of a solid polygonal model representing the "5900" reservoir in the West Cameron 504 oil and gas field.

Another example of an output from the method 1000 is shown in FIG. 18 that illustrates a portion of the West Cameron 504 oil and gas field, located in the Gulf of Mexico. The "5900" reservoir of that field 1802 is shown as a solid three-dimensional irregular polygonal model as produced by the method of this invention. The reservoir model shows significant variations in reservoir thickness as indicated by the thinning of the model to the left of the figure. The black lines 1804 in FIG. 18 represent the three-dimensional tracks of wells in and around the "5900" reservoir.

Figure 19:
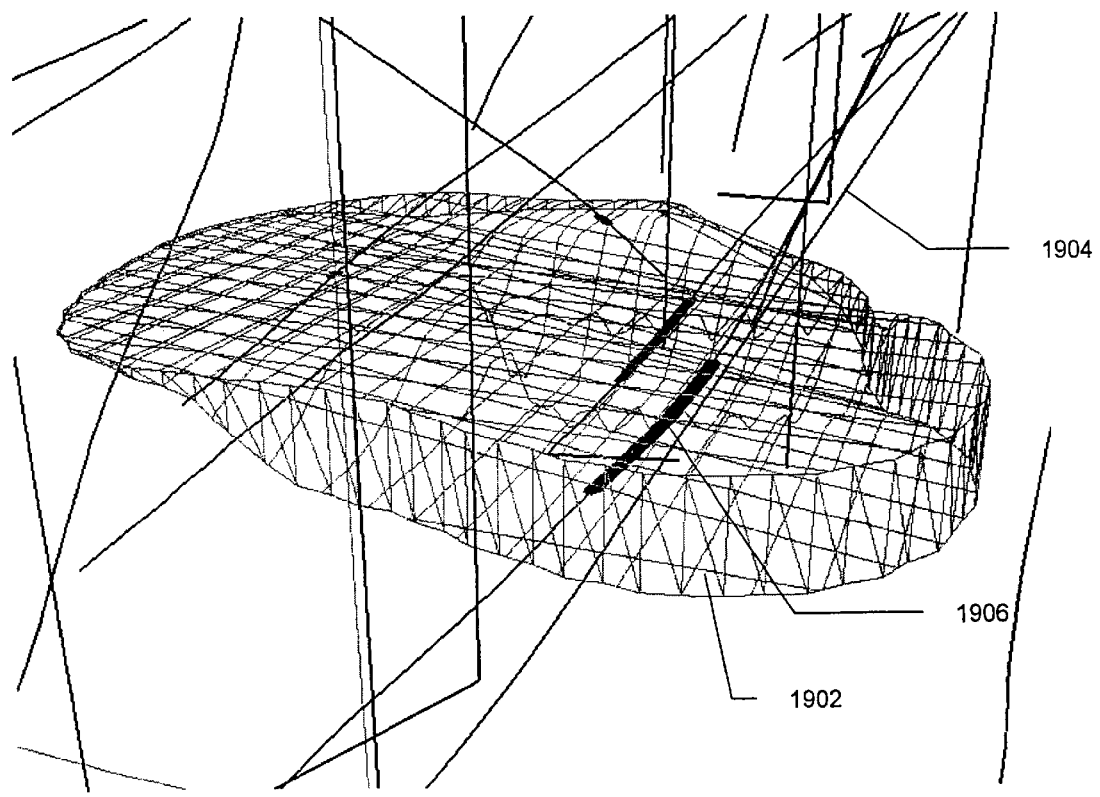
FIG. 19 provides the wire frame model equivalent of the solid model in FIG. 18 showing the relationship of the reservoir boundary to wells and well completions within it in the "5900" reservoir in the West Cameron 504 oil and gas field.
Figure 20:
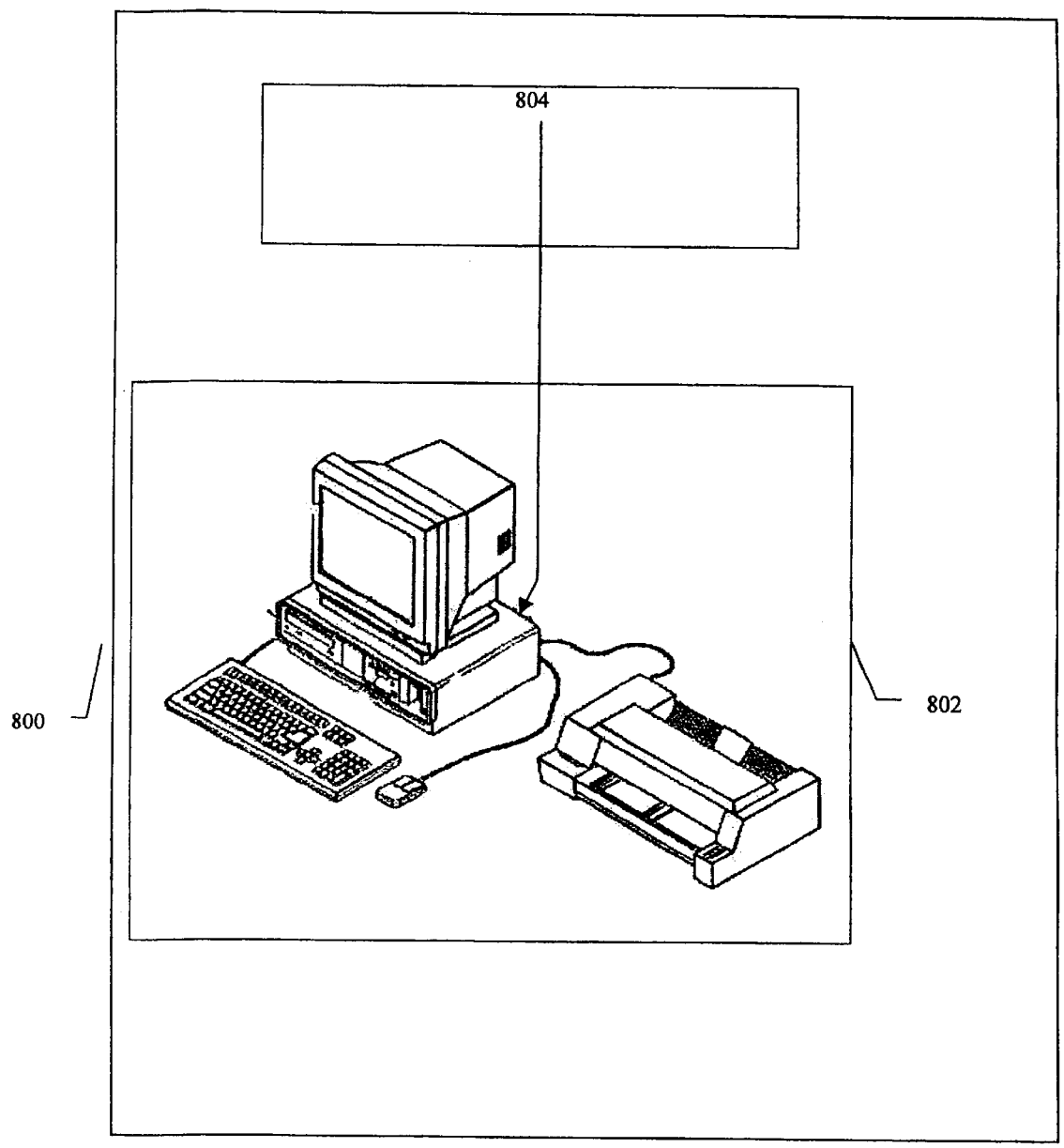
FIG. 20 shows an illustrative system that is in accordance with the principles of the present invention.

FIG. 19 shows a wire frame model of the "5900" reservoir in the West Cameron 504 oil and gas field shown as a solid model in FIG. 20. The wire frame model 1902 shows the paths of the wells 1904 through the reservoir. Also shown within the reservoir are the locations of the completions on the wells producing from the "5900" reservoir 1906. The locations of the completions and the well paths through the reservoir are visible in the wire frame model, but not in the solid model.

The System

Referring to FIG. 20, the present invention provides a system 800 comprising of a computer system 802 and processing software 804 that can be used to create a three-dimensional irregular volume model within a GIS platform stored in the computer system 802 using any of the above-described method(s) (100, 500, 1000) of the present invention. The computer system is comprised of digital processor, working memory, data storage device, input means (e.g., mouse, keyboard, and the like), display monitor, and optionally, output means (e.g., printer and the like). An example of a suitable computer system 802 is a Dell Inspiron 8000 computer made by Dell Computer Corporation (Round Rock, Tex.) with an HP1200C Color Ink Jet Printer made by Hewlett Packard Corporation. The Dell Inspiron 8000 computer has a 750-megahertz Pentium III central processing unit (CPU) made by Intel (Santa Clara, Calif.); a 32-megabyte video random access memory (VRAM), RAGE Mobility 128 AGP 4x video card made by ATI Technologies Inc. (Ontario, Canada); 540 megabytes of random access memory (RAM) and a single 40-gigabyte hard disk for storage. Its operating system is Windows NT 4.0, Service Pack 5, made by Microsoft Corporation (Redmond, Wash.). Examples of the software components of the present invention include, without limitations, Earth Science Associates' GOM$^3$ system, ArcView 3.2, ESRI's extensions to ArcView, Spatial Analyst 1.1 and 3-D Analyst 1.0 and Personal Oracle 8i, a product of Oracle Corporation (Redwood Shores, Calif.). Alternative ESRI ArcView versions (such as 3.3, 8.2 and 8.3) may also be used. Also alternative versions of Spatial Analyst (e.g., version 2.0 and the ArcGIS version, if ArcView 8.x is being used) and the 3-D Analyst extensions (e.g., 3-D Analyst for ArcGIS, if ArcView 8.x is being used) may also be used. Furthermore, alternative Oracle relational database management systems and alternative versions of Personal Oracle may be used or relational database management systems produced by other companies that may be queried using the SQL programming language and are accessible from ArcView via ODBC. These include, but are not limited to, SQL Server, Visual FoxPro, Access and dBase, all products of Microsoft Corporation. It is preferred that Earth Science Associates' GOM$^3$ system is loaded after loading ArcView, its extensions and Oracle.

Please note that these examples are for the purpose of illustration only and are not to be construed as limiting the scope of the invention in any way. Moreover, it should be appreciated that other suitable computer systems and processing software may be used for the system 800.

Exemplary Applications of the Present Invention

The method and the system of the present invention described above can be applied generally to the development of models of irregular three-dimensional volumes within a three-dimensional GIS platform. Models of these irregular dimensional volumes can be used in numerous different types of applications including, without limitations, reservoirs in oil and gas fields, concentrations of specific elements or compounds (e.g., metal, diamonds, and the like) in a specific geographical area, aquifers (e.g., to represent volumes of rock occupied by water), quality of a specific volume of air or water over a geographical area, and the like. For example, the present invention could be applied in mining where the threshold value of an element or compound indicates the boundary of a minable deposit. It could also be applied to the definition of the boundaries of a rock body where the interstitial fluids contained greater than a threshold value of an element or compound. While this application might also be used in mining, its wider application would be in environmental analysis. In those instances, the location data for the threshold value of a pollutant in interstitial fluids would be determined from well data and the methods of the invention applied to determine a three-dimensional irregular polygonal model of the pollution plume, within which the threshold concentration was met or exceeded.

As another example, the present invention can be used in creation of irregular three-dimensional polygonal models of specific contiguous water volumes with the ocean, sea, lake, river or other water body. A contiguous mass of water with the same value of a specified attribute (e.g., temperature, salinity, concentration of a pollutant, range of flora or fauna) would be defined by location points from a sampling program that determined the lateral boundary and water depths over which the values of the attribute exceed a threshold level. The present invention could then be applied to that data to produce a solid or wire frame three-dimensional irregular polygonal model for that specified water volume.

Yet another example, the present invention can also be used in creation of three-dimensional irregular polygonal models of specific contiguous air masses within the atmosphere. A contiguous air mass with the same value of a specified attribute (e.g., temperature, humidity, concentration of a pollutant) would be defined by location points from a sampling program that determined the lateral boundary and elevations above the earth's surface over which the values of the attribute exceeded a threshold level. The present invention could then be applied to that data to produce a solid or wire frame three-dimensional irregular polygonal model for that specified air mass.

Finally, it is also possible to generalize the present invention so that the product of its application is a set of nested three-dimensional irregular polygonal models of volumes of rock, water or air. In such applications, increasing or decreasing values of a continuous attribute variable are used and more than one threshold is defined by the user. The methods of the invention are then iteratively applied to produce more than one model. Because of the continuous nature of the variable, the several polygonal models that would be produced would be nested within each other. This generalization has application in all of the areas mentioned above.

Not of the above outlined steps need to be performed to be within the scope of the present invention. Fewer steps can be performed. Furthermore, the sequence of steps can vary, and is not limited to the above-description.

Although the present invention has been described in some detail by way of illustrations and examples for purposes of clarity of understanding, it will be readily apparent to those of ordinary skill in the art in light of the teachings of this invention that certain changes and modifications may be made thereto without departing from the spirit or scope of the appended claims. Moreover, the above-described examples are for the purpose of illustration only and are not to be construed as limiting the scope of the invention in any way.

What is claimed is:

1. A method for constructing a solid three-dimensional polygonal model of a three-dimensional irregular volume within a GIS platform comprising:
    (a) introducing desired data including control points and attributes relating to said three-dimensional irregular volume into said GIS platform;
    (b) estimating at least one two-dimensional polygon representing a lateral boundary of said three-dimensional irregular volume based upon values of variable of interest at said control points;
    (c) estimating irregular surfaces representing top and bottom of said three-dimensional irregular volume by interpolating grids of depth values from said control points for said top and bottom surfaces of said three-dimensional irregular volume;
    (d) clipping said estimated irregular surfaces with said estimated at least one two-dimensional polygon;
    (e) constructing multipatches of a network of triangular panels representing top surface, bottom surface, and sides of said three-dimensional irregular volume to produce said solid three-dimensional irregular volume model within said GIS platform; and
    (f) joining said attributes to said solid three-dimensional irregular volume model within said GIS platform.

2. The method of claim 1 further comprising of repeating said steps (a) through (f) to create at least two different solid three-dimensional irregular volume models within said GIS platform.

3. The method of claim 1, wherein said step (c) of estimating irregular surfaces is comprised of:
    computing a bounding rectangle for said at least one two-dimensional polygon based on the maximum north, south, east and west control points in polylineZ created in said step (b) of estimating at least one two-dimensional polygon;
    determining grid parameters based upon grid density parameters and size of said bounding rectangle;
    applying an interpolation algorithm to all multipointZs representing said control points for said top irregular surface of said three-dimensional irregular volume to create a grid of values with a geographic extent equal to said bounding rectangle;
    assigning depth values to all points in polypointZ representing said lateral boundary for said top irregular surface based on interpolation from said grid of values of said top irregular surface, thereby creating a first multipointZ list;
    applying said interpolation algorithm to all multipointZs representing said control points for said bottom irregular surface of said three-dimensional irregular volume to create a grid of values with a geographic extent equal to said bounding rectangle; and
    assigning depth values to all points in polypointZ representing said lateral boundary for said bottom irregular surface based on interpolation from said grid of values of said bottom irregular surface, thereby creating a second multipointZ list.

4. The method of claim 1 wherein said step (e) of constructing multipatches is comprised of:
    sorting a multipointZ list for each of said top and bottom irregular surfaces;
    creating a new sorted multipointZ list for each of said top and bottom irregular surfaces containing only multipointZs in two polylineZ lists representing said top and bottom lateral boundaries of said at least one two-dimensional polygon;
    creating a multipatch for each of said top and bottom irregular surfaces using said sorted multipoint Z lists;
    adding said multipatch for said top irregular surface and said multipatch for said bottom irregular surface together to create a new multipatch; and
    creating a multipatch for sides of said three-dimensional irregular volume using said sorted multipointZ list and adding said multipatch for sides to said new multipatch to create a complete multipatch for said three-dimensional irregular volume.

5. The method of claim 4 wherein said sorting a multipoint Z list step is comprised of:
    creating a geographically sorted table and a list of unique latitudes from a multipointZ list using latitude as primary sort key and longitude as secondary sort key for each of said top and bottom irregular surfaces;
    creating a single strip for every latitude in said list of unique latitudes;
    creating dual strips from all said single strips for each of said irregular surfaces;
    creating a new sorted list of multipointZs from each of said dual strips;
    checking each of said sorted dual strips for gaps; and dividing said sorted dual strips with gaps into shorter dual strips without gaps; and
    creating a final list of sorted multipointZs that includes all points in all said dual strips for each of said top and bottom irregular surfaces such that points within each said dual strip are ordered in a first desired direction and said order of the dual strips within the list is in a second desired direction.

6. The method of claim 1 further comprising of adding features that are not created by said steps (a) through (f) wherein said features are selected from the group consisting of two-dimensional structures, polylines, multipoints, grids, raster images, vector data, potential field, seismic techniques, and a combination thereof.

7. The method of claim 1 wherein said solid three-dimensional irregular volume model is used within said GIS platform to represent an object selected from the group consisting of: an oil reservoir, an gas reservoir, concentration of a specific compound in a specific geographical area, an aquifer, quality of a specific volume of air over a geographical area, quality of a specific volume of water over a geographical area, and a combination thereof.

8. The method of claim 1 in wherein:
said steps (a) to (f) is repeated for each desired solid three-dimensional polygonal model of a three-dimensional irregular volume within said GIS platform; and
conducting the following steps to construct each desired wire-frame three-dimensional polygonal model of a three-dimensional irregular volume with said GIS platform:
repeating said steps (a) to (d);
constructing a grid of regularly spaced polylineZs representing top surface, bottom surface, and sides of said three-dimensional irregular volume to produce said wire frame three-dimensional irregular volume model within said GIS platform; and
joining said attributes to said wire-frame three-dimensional irregular volume model within said GIS platform.

9. A method for constructing a wire-frame three-dimensional polygonal model of a three-dimensional irregular volume within a GIS platform comprising:
(a) introducing desired data including control points and attributes relating to said three-dimensional irregular volume into said GIS platform;
(b) estimating at least one two-dimensional polygon representing a lateral boundary of said three-dimensional irregular volume based upon values of variable of interest at said control points;
(c) estimating irregular surfaces representing top and bottom of said three-dimensional irregular volume by interpolating grids of depth values from said control points for said top and bottom surfaces of said three-dimensional irregular volume;
(d) clipping said estimated irregular surfaces with said estimated at least one two-dimensional polygon;
(e) constructing a grid of regularly spaced polylineZs representing top surface, bottom surface, and sides of said three-dimensional irregular volume to produce said wire frame three-dimensional irregular volume model within said GIS platform; and
(f) joining said attributes to said wire-frame three-dimensional irregular volume model within said GIS platform.

10. The method of claim 9 further comprising of repeating said steps (a) through (f) to create at least two different wire-frame three-dimensional irregular volume models within said GIS platform.

11. The method of claim 9, wherein said step (c) of estimating irregular surfaces is comprised of:
computing a bounding rectangle for said at least one two-dimensional polygon based on the maximum north, south, east and west control points in polylineZ created in said step (b) of estimating at least one two-dimensional polygon;
determining grid parameters based upon grid density parameters and size of said bounding rectangle;
applying an interpolation algorithm to all multipointZs representing said control points for said top irregular surface of said three-dimensional irregular volume to create a grid of values with a geographic extent equal to said bounding rectangle;
assigning depth values to all points in polypointZ representing said lateral boundary for said top irregular surface based on interpolation from said grid of values of said top irregular surface, thereby creating a first multipointZ list;
applying said interpolation algorithm to all multipointZs representing said control points for said bottom irregular surface of said three-dimensional irregular volume to create a grid of values with a geographic extent equal to said bounding rectangle; and
assigning depth values to all points in polypointZ representing said lateral boundary for said bottom irregular surface based on interpolation from said grid of values of said bottom irregular surface, thereby creating a second multipointZ list.

12. The method of claim 9, wherein said step (e) of constructing a grid of regularly spaced polylineZs is comprised of:
creating a wire frame lattice of polylineZs to represent lines of said wire-frame three-dimensional polygonal model;
assigning depths to each of said wire frame lattices representing said top and bottom irregular surfaces of said three-dimensional irregular volume; and
merging said wire frame lattices representing top surface, bottom surface, and sides of said three-dimensional irregular volume to form said wire frame three-dimensional polygonal model of said three-dimensional irregular volume.

13. The method of claim 9 further comprising of adding features that are not created by said steps (a) through (f), wherein said features are selected from the group consisting of two-dimensional structures, polylines, multipoints, grids, raster images, vector data, potential field, seismic techniques, and a combination thereof.

14. The method of claim 13 further comprising of adding features selected from the group consisting of two-dimensional structures, polylines, multipoints, grids, raster images, vector data, potential field, seismic techniques, and a combination thereof.

15. The method of claim 9 wherein said wire-frame three-dimensional irregular volume model is used within said GIS platform to represent an object selected from the group consisting of: an oil reservoir, an gas reservoir, concentration of a specific compound in a specific geographical area, an aquifer, quality of a specific volume of air over a geographical area, quality of a specific volume of water over a geographical area, and a combination thereof.

16. A method for constructing at least one three-dimensional polygonal model of an oil and gas reservoir within a GIS platform comprising:
(a) collecting data on at least one oil and gas reservoir and attributes that will be used to create said three-dimensional irregular polygonal model of said at least one reservoir within a GIS platform;
(b) loading desired software on to a computer system;

(c) organizing said data into a database and said GIS platform;
(d) estimating at least one two-dimensional polygon representing a lateral boundary of said at least one reservoir;
(e) identifying an oil and gas field with said at least one reservoir for creating said three-dimensional irregular polygonal model of said at least one reservoir within said GIS platform;
(f) estimating irregular surfaces representing top and bottom of said at least one reservoir based on said control points provided by said wells that intersect said at least one reservoir;
(g) clipping said estimated irregular surfaces with said estimated at least one two-dimensional polygon;
(h) constructing multipatches to represent top surface, bottom surface and sides of said at least one reservoir to produce said solid volume three-dimensional irregular polygonal model of said at least one reservoir within said GIS platform; and
(i) joining said attributes data on said at least one reservoir to said multipatch of said solid volume three-dimensional irregular polygonal model of said at least one reservoir within said GIS platform.

17. The method of claim 16 wherein,
said step (e) of identifying an oil and gas field with said at least one reservoir is comprised of:
selecting individual field to be modeled in three-dimensions using a hot link tool;
selecting model type, elements to be included in three-dimensional model and set legends; and
selecting gridding control parameters.

18. The method of claim 16 wherein,
said step (f) of estimating irregular surfaces representing top and bottom of said at least one reservoir is comprised of:
computing a bounding rectangle for said at least one two-dimensional polygon based on the maximum north, south, east and west control points in polylineZ created in said step (d) of estimating at least one two-dimensional polygon;
determining grid parameters based upon grid density parameters and size of said bounding rectangle;
retrieving multipointZs lists representing top and bottom surfaces of said at least one reservoir at each well intersection;
applying an interpolation algorithm to all multipointZs representing said control points for said top surface of said at least one reservoir to create a grid of values with a geographic extent equal to said bounding rectangle;
assigning depth values to all points in polypointZ representing said lateral boundary for said top surface based on interpolation from said grid of values of said top surface, thereby creating a first multipointZ list;
applying said interpolation algorithm to all multipointZs representing said control points for said bottom surface of said at least one reservoir to create a grid of values with a geographic extent equal to said bounding rectangle; and
assigning depth values to all points in polypointZ representing said lateral boundary for said bottom surface based on interpolation from said grid of values of said bottom surface, thereby creating a second multipointZ list.

19. The method of claim 16 wherein said step (h) of constructing multipatches to represent top surface, bottom surface and sides of said at least one reservoir is comprised of:
sorting a multipointZ list for each of said top and bottom surfaces;
preparing polylineZs for each of said top and bottom surfaces reservoir boundaries for triangular;
creating a multipatch for each of said top and bottom surfaces of said at least one reservoir;
adding said multipatch for said top surface and said multipatch for said bottom surface together to create a new multipatch; and
creating a multipatch for sides of said at least one reservoir and adding said multipatch for sides to said new multipatch to create a complete multipatch for the at least one reservoir.

20. The method of claim 19 wherein said sorting a multipoint Z list step is comprised of:
creating a geographically sorted table and a list of unique latitudes from a multipointZ list using latitude as primary sort key and longitude as secondary sort key for each of said top and bottom surfaces;
creating a single strip for every latitude in said list of unique latitudes;
creating dual strips from all said single strips for each of said top and bottom surfaces;
creating a new sorted list of multipointZs from each of said dual strips;
checking each of said sorted dual strips for gaps; and dividing said sorted dual strips with gaps into shorter dual strips without gaps; and
creating a final list of sorted multipointZs that includes all points in all said dual strips for each of said top and bottom surfaces such that points within each said dual strip are ordered in a first desired direction and said order of the dual strips within the list is in a second desired direction.

21. The method of claim 16 further comprising:
constructing a grid of regularly spaced polylineZs representing top surface, bottom surface, and sides of said at least one reservoir to produce a wire frame three-dimensional model of said at least one reservoir within said GIS platform; and
joining said attributes to said wire-frame three-dimensional model of said at least one reservoir within said GIS platform.

22. The method of claim 16 further comprising of adding features that are not created by said steps (a) through (f), wherein said features are selected from the group consisting of two-dimensional structures, polylines, multipoints, grids, raster images, vector data, potential field, seismic techniques, and a combination thereof.

23. A method according to claim 1 wherein said steps (a) through (f) are all performed using a computer system and processing software.

24. A method according to claim 9 wherein said steps (a) through (f) are all performed using a computer system and processing software.

25. A method according to claim 16 wherein said steps (b) through (i) are all performed using a computer system and processing software.

* * * * *